(12) United States Patent
McGrath

(10) Patent No.: US 9,052,001 B2
(45) Date of Patent: Jun. 9, 2015

(54) CYCLOID DRIVE EPICYCLOID PLANET GEAR CAM

(71) Applicant: MECHATRONICSASIA ENTERPRISE, Taipei (TW)

(72) Inventor: Patrick James McGrath, Taipei (TW)

(73) Assignee: MechatronicsAsia Enterprise, Taipei (TW)

( * ) Notice: Subject to any disclaimer, the term of this patent is extended or adjusted under 35 U.S.C. 154(b) by 323 days.

(21) Appl. No.: 13/691,911

(22) Filed: Dec. 3, 2012

(65) Prior Publication Data

US 2014/0150601 A1 Jun. 5, 2014

(51) Int. Cl.
*F16H 25/14* (2006.01)
*F16H 1/32* (2006.01)

(52) U.S. Cl.
CPC .............. *F16H 25/14* (2013.01); *Y10T 74/2107* (2015.01); *F16H 1/32* (2013.01)

(58) Field of Classification Search
CPC combination set(s) only.
See application file for complete search history.

(56) References Cited

U.S. PATENT DOCUMENTS

| 4,570,500 | A | * | 2/1986 | Richter | .............................. | 74/54 |
| 2001/0046919 | A1 | * | 11/2001 | Hagiike | ........................ | 475/181 |
| 2005/0070399 | A1 | * | 3/2005 | Redfield | ........................ | 475/331 |

* cited by examiner

*Primary Examiner* — Robert Hodge
*Assistant Examiner* — Alberto Interian, III
(74) *Attorney, Agent, or Firm* — Rosenberg, Klein & Lee

(57) ABSTRACT

An epicycloid planet gear cam that converts rotational movement of a driveshaft into linear movement of an output device is disclosed. An epicycloid planet gear is assembled inside a stationary housing with an internal stationary ring gear. A driveshaft eccentric is connected to a driveshaft. The driveshaft eccentric rotates freely in a mounting hole of the epicycloid planet gear. When the driveshaft rotates, the driveshaft eccentric engages the epicycloid planet gear against the stationary ring gear and causes the epicycloid planet gear to rotate. A cam follower pin attached to an output device is held against a cam track of the epicycloid planet gear. As the epicycloid planet gear rotates, the raised cam track height or the slotted cam track distance from the center of the epicycloid planet gear causes the cam follower pin to move up, down, in, or out thereby moving the output device.

19 Claims, 38 Drawing Sheets

CYCLOID DRIVE EPICYCLOID PLANET GEAR CAM

BACKGROUND OF THE INVENTION

1. Field of the Invention

The present invention relates to cycloid drives. More specifically, the present invention discloses an epicycloid planet gear mounted raised cam track or slotted cam track for converting rotational movement of a driveshaft into linear movement of an output object while utilizing the advantageous speed reduction and torque magnification properties of a cycloid drive.

2. Description of the Prior Art

A leadscrew is a screw used to translate rotary input motion into linear output motion. The conventional leadscrew is a threaded screw that mates with a nut. As the threaded screw rotates, the nut moves along the screw either forward or backward. A load connected to the nut moves along with the nut.

While useful in various applications the conventional leadscrew has numerous disadvantages.

One disadvantage is that the threaded screw and nut require high manufacturing precision and, so, are relatively high cost.

Another disadvantage is that very fine movements per rotation are difficult to achieve because of the difficulty of machining very fine pitch threads.

Also, conventional leadscrews must be well lubricated throughout their service life as high stiction (static friction) will require high start up forces after long periods of immobility if the leadscrew's lubrication layer isn't maintained.

Furthermore, applying force on the load attached to the nut can cause the conventional leadscrew to rotate or back drive. In many applications this is undesirable as contact with the load can cause unintentional movement of the leadscrew and change in the load position.

Moreover, conventional leadscrews driving offset loads can be relatively inefficient.

Another method for translating rotary motion into linear motion is by using a speed reduction gear train whose output gear causes a circular cam to rotate, thereby creating linear output motion of some driven component.

One disadvantage of using such a gear train driven cam to produce linear output motion is the complexity of the gear train required to reduce rotary input speed to a useful slower output speed at higher torque, particularly in compact devices such as a digital camera.

Another disadvantage is the tolerance stackup of so many mating components causes mechanical inefficiency and positional inaccuracy of the output device.

Therefore, there is need for an improved means of efficiently, compactly, accurately and economically translating rotational motion into linear motion.

SUMMARY OF THE INVENTION

To achieve these and other advantages and in order to overcome the disadvantages of the conventional method in accordance with the purpose of the invention as embodied and broadly described herein, the present invention provides an epicycloid planet gear mounted raised cam track or slotted cam track that converts rotational movement of a driveshaft into linear movement of an output device.

The epicycloid planet gear cam of the present invention simultaneously converts rotary motion to linear, reciprocating output motion, reduces speed, and increases torque, unlike a conventional rotary cam or rotary face cam which only converts rotary motion to linear, reciprocating output movement.

The epicycloid planet gear cam of the present invention comprises a stationary housing with an internal stationary ring gear. An epicycloid planet gear is assembled inside the stationary housing and a housing cap. A driveshaft eccentric is connected to any driveshaft such as, for example a driveshaft of a direct current (DC) motor or a manually rotated driveshaft. The driveshaft eccentric freely rotates in a mounting hole of the epicycloid planet gear. When the driveshaft rotates, the driveshaft eccentric engages the epicycloid planet gear with the stationary ring gear in standard cycloid drive fashion and causes the epicycloid planet gear to independently rotate around the driveshaft eccentric in a direction of rotation opposite that of the driveshaft at a standard cycloid speed reduction rate, r, of $r=(P-L)/L$ where P equals the number of ring gear lobes on the stationary housing and L is the number of cycloid lobes on the eccentrically rotating epicycloid planet gear. For example, if there are 11 ring gear lobes on the stationary ring gear and 10 cycloid lobes on the epicycloid planet gear the speed reduction ratio that the epicycloid planet gear would rotate at relative to the stationary housing is $r=(11-10)/10=1/10$. At the same time, the output torque of the rotating epicycloid planet gear would be ten times greater than the input torque minus a small factor for mechanical losses.

Further instructions for implementing the present invention may be obtained by referring to "Designing and machining of the epicycloid planet gear of cycloid drives" by Ta-Shi Lai and published in The International Journal of Advanced Manufacturing Technology, April 2006, Volume 28, Issue 7-8, pp 665-670.

If the driveshaft eccentric incorporates a counterbalance feature as in the present embodiment, any significant high speed vibrations caused by any unbalanced rotating forces of the eccentric are eliminated. A second, counterbalancing epicycloid planet gear can also be incorporated in the invention to eliminate any and all sources of vibration in an epicycloid planet gear cam device.

The epicycloid planet gear further comprises a raised cam track of varying height from the body of the epicycloid planet gear or a slotted cam track varying in distance from the center of the epicycloid planet gear. A cam follower pin is held against the cam track. As the epicycloid planet gear rotates, the height of the raised cam track causes the cam follower pin to move up or move down, or the distance from center of the slotted cam track causes the cam follower pin to move in or out. Since the cam follower pin is connected to an output device such as, for example, a camera lens, the output device moves along with the cam follower pin.

As a result, the epicycloid planet gear cam of the present invention simply and effectively converts rotational movement of the driveshaft into linear movement of the output device.

Additionally, the epicycloid planet gear cam of the present invention is more efficient and adaptable than conventional leadscrews. The efficiency benefit provided by the cooperation of the epicycloid planet gear, the internal stationary ring gear, and the driveshaft eccentric is superior to conventional leadscrews. Also, the flexibility in design of the cam track of the present invention allows for advanced control of movement of the output device that can not be matched by conventional leadscrews without costly electronic control systems. In addition, very fine, accurate and repeatable output movements per input rotation can be easily achieved with a varying height epicycloid planet gear cam track or slot that are prohibitive to do with a leadscrew or gear train device. For example, a linear output motion of 0.01 mm per input rotation of some device such as a motor can easily be achieved by creating a 10-to-1 speed reduction epicycloid planet gear with a raised cam track of 0.1 mm from start to end. Manufacturing a small leadscrew with a pitch of 0.01 mm is beyond the capability of current manufacturing technology though.

Furthermore, the simplicity of the epicycloid planet gear cam allows for ease of manufacture and assembly thereby reducing production costs.

Moreover, the low friction inherent in the epicycloid planet gear cam results in low stiction and low wear on components of the epicycloid planet gear cam thereby extending the operational lifetime and reducing the power requirements of the epicycloid planet gear cam driven device relative to other devices.

These and other objectives of the present invention will become obvious to those of ordinary skill in the art after reading the following detailed description of preferred embodiments.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1A:
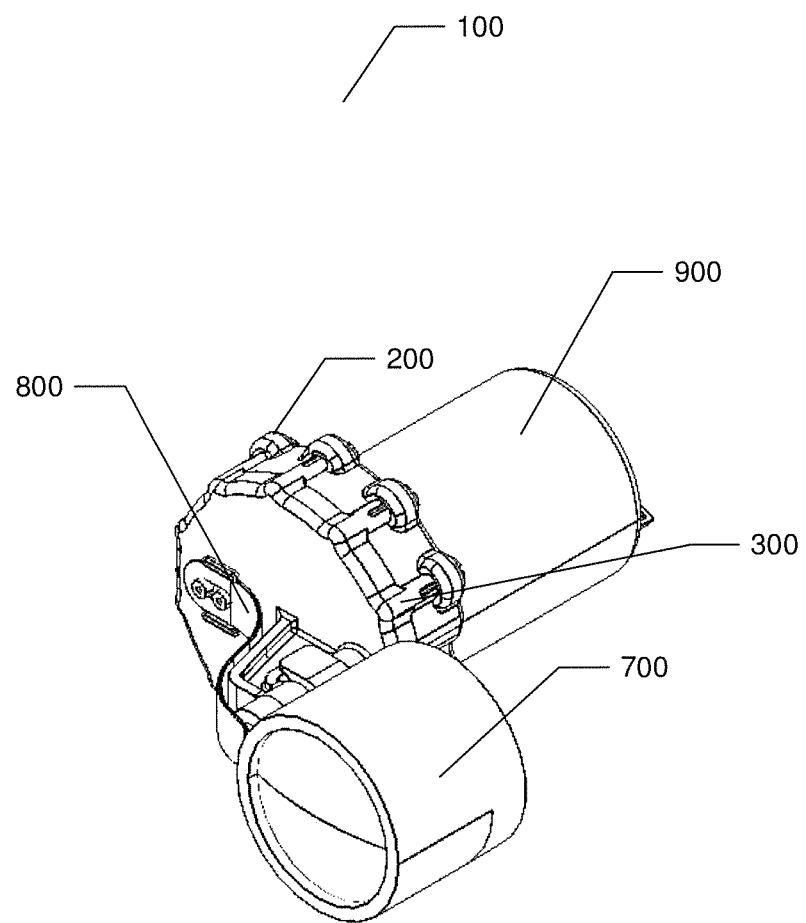
FIG. 1A is an isometric view drawing illustrating an epicycloid planet gear cam according to an embodiment of the present invention.
Figure 1B:
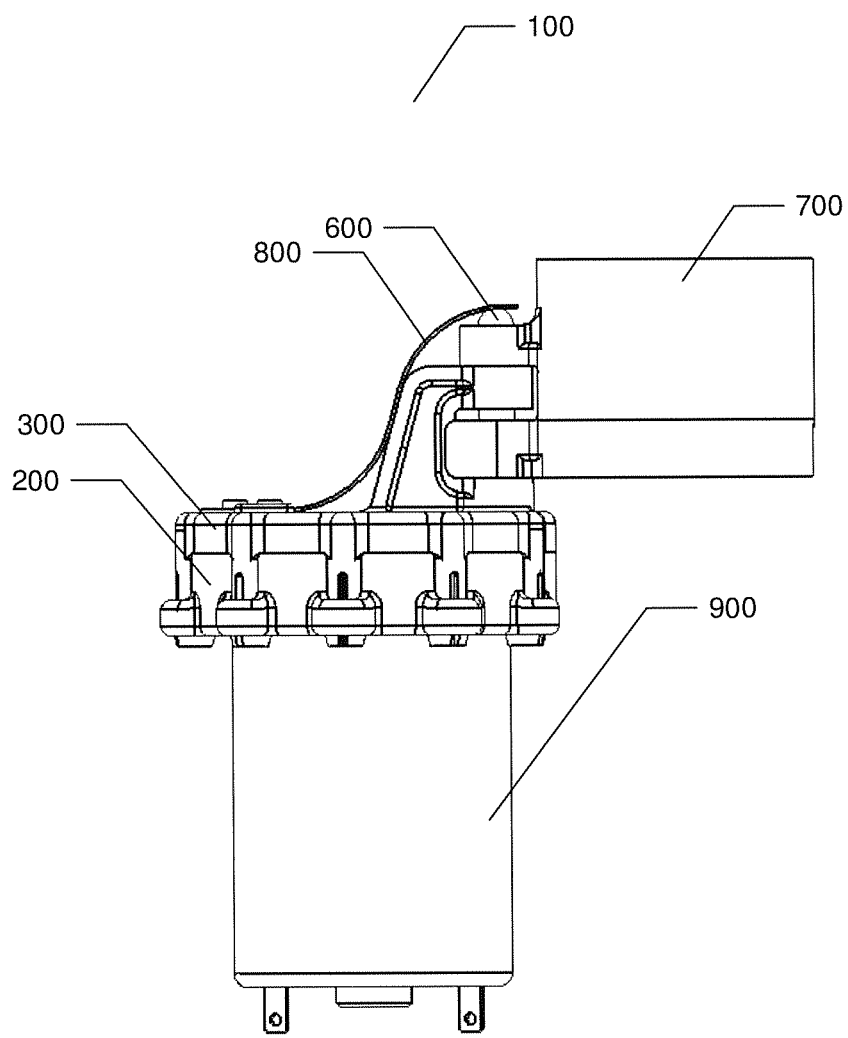
FIG. 1B is a side view drawing illustrating an epicycloid planet gear cam according to an embodiment of the present invention.
Figure 1C:
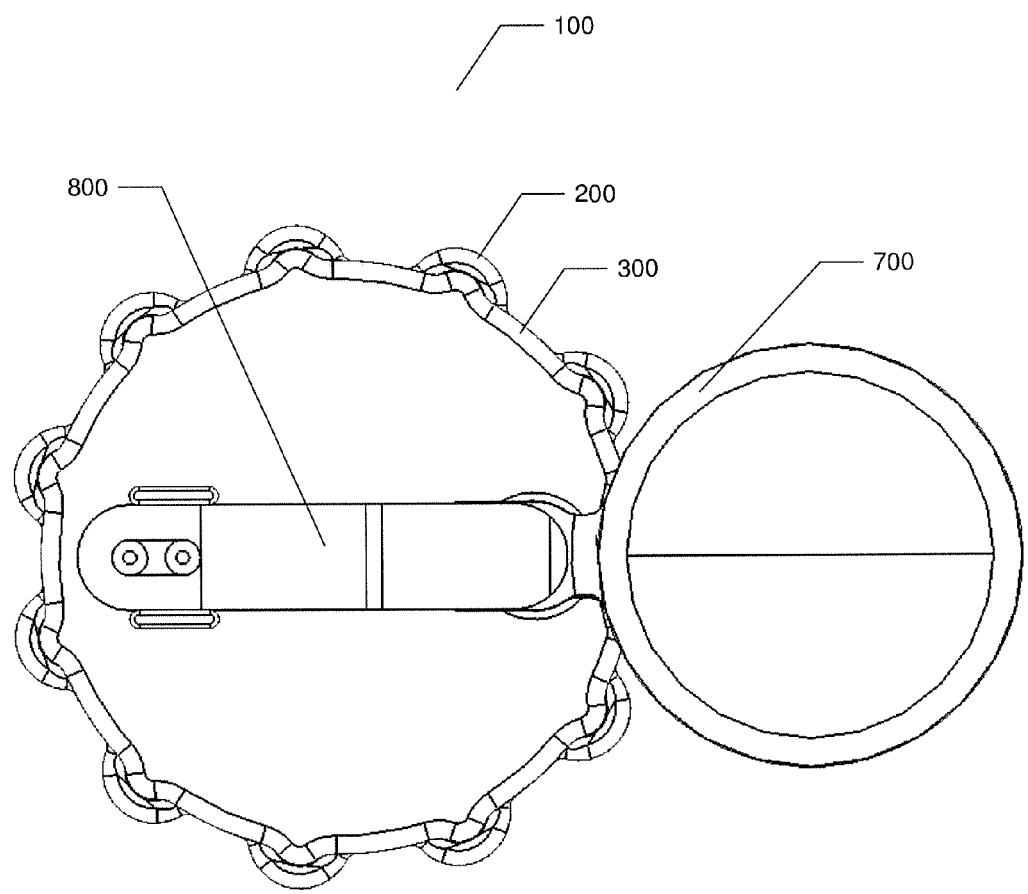
FIG. 1C is a top view drawing illustrating an epicycloid planet gear cam according to an embodiment of the present invention.
Figure 1D:
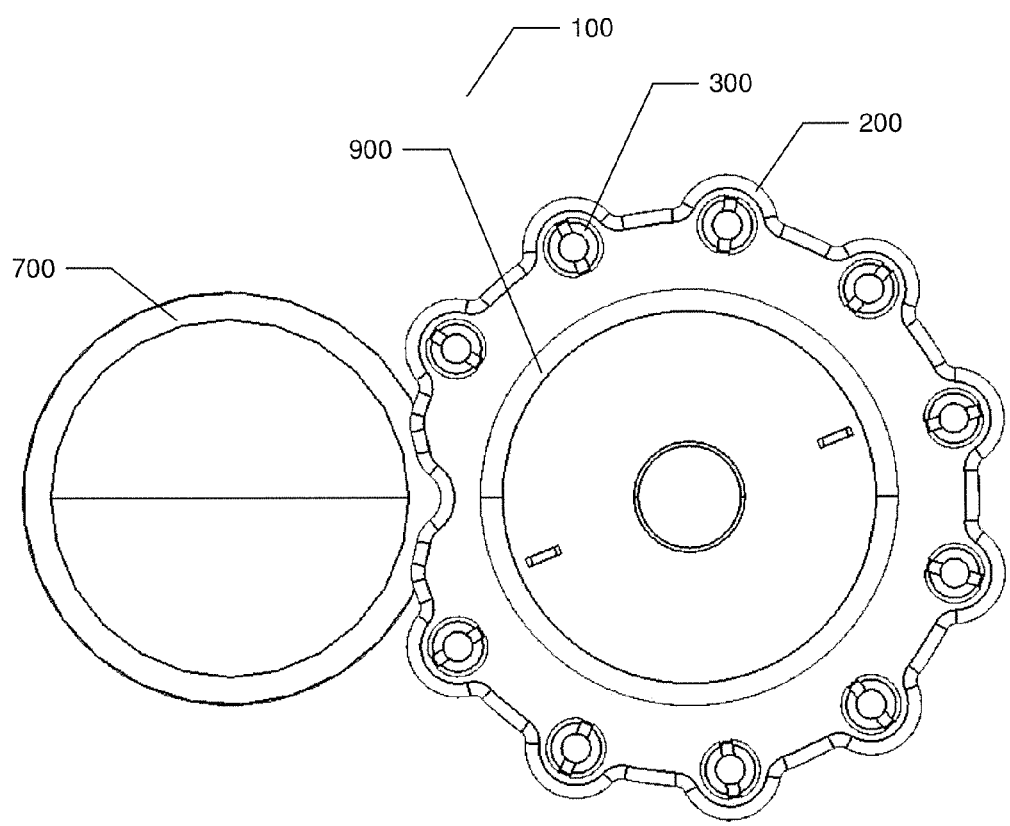
FIG. 1D is a bottom view drawing illustrating an epicycloid planet gear cam according to an embodiment of the present invention.
Figure 2A:
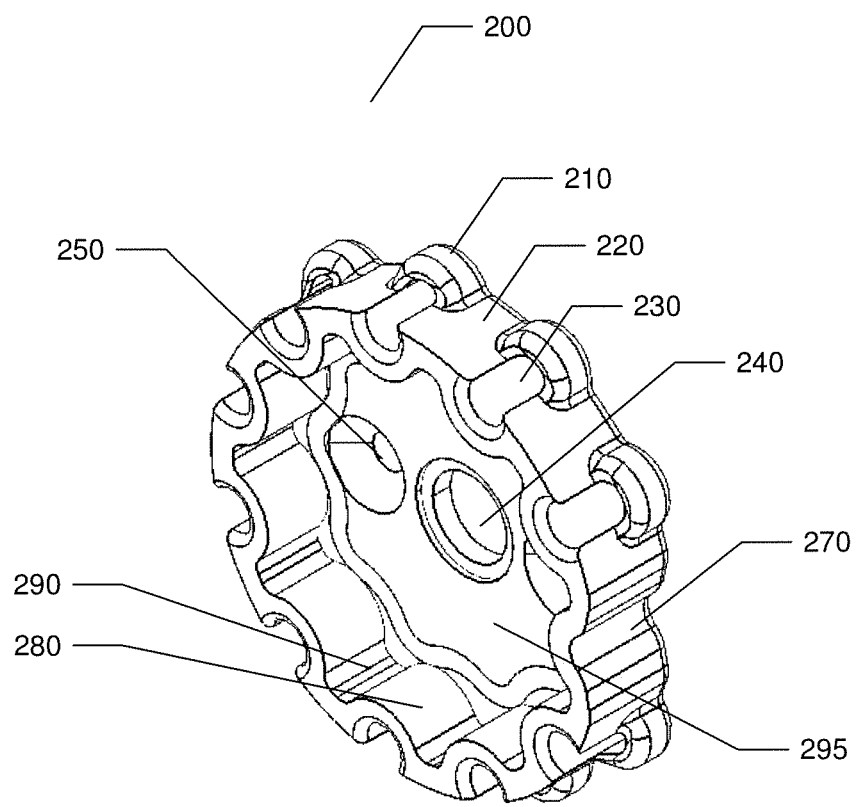
FIG. 2A is an isometric view drawing illustrating a stationary housing according to an embodiment of the present invention.
Figure 2B:
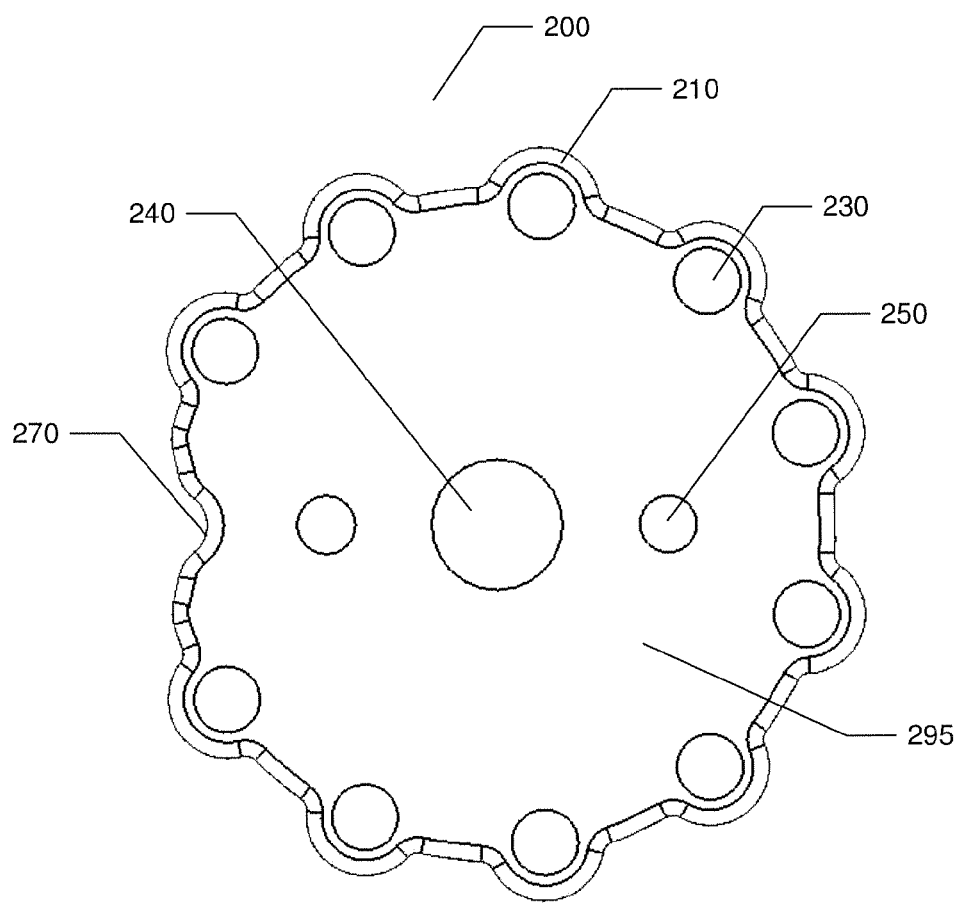
FIG. 2B is a bottom view drawing illustrating a stationary housing according to an embodiment of the present invention.
Figure 2C:
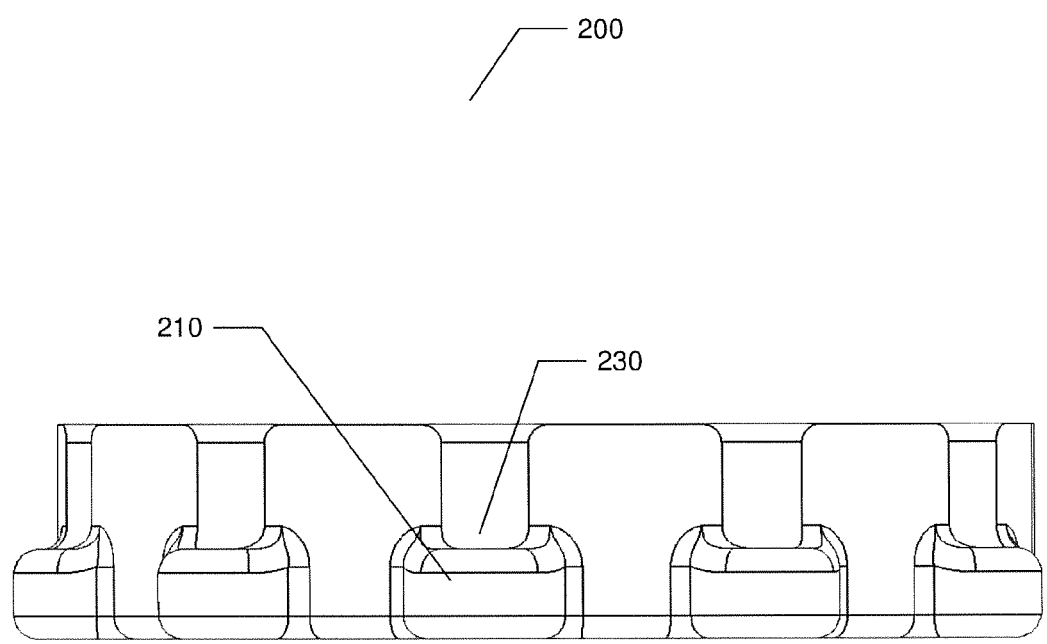
FIG. 2C is a side view drawing illustrating a stationary housing according to an embodiment of the present invention.
Figure 2D:
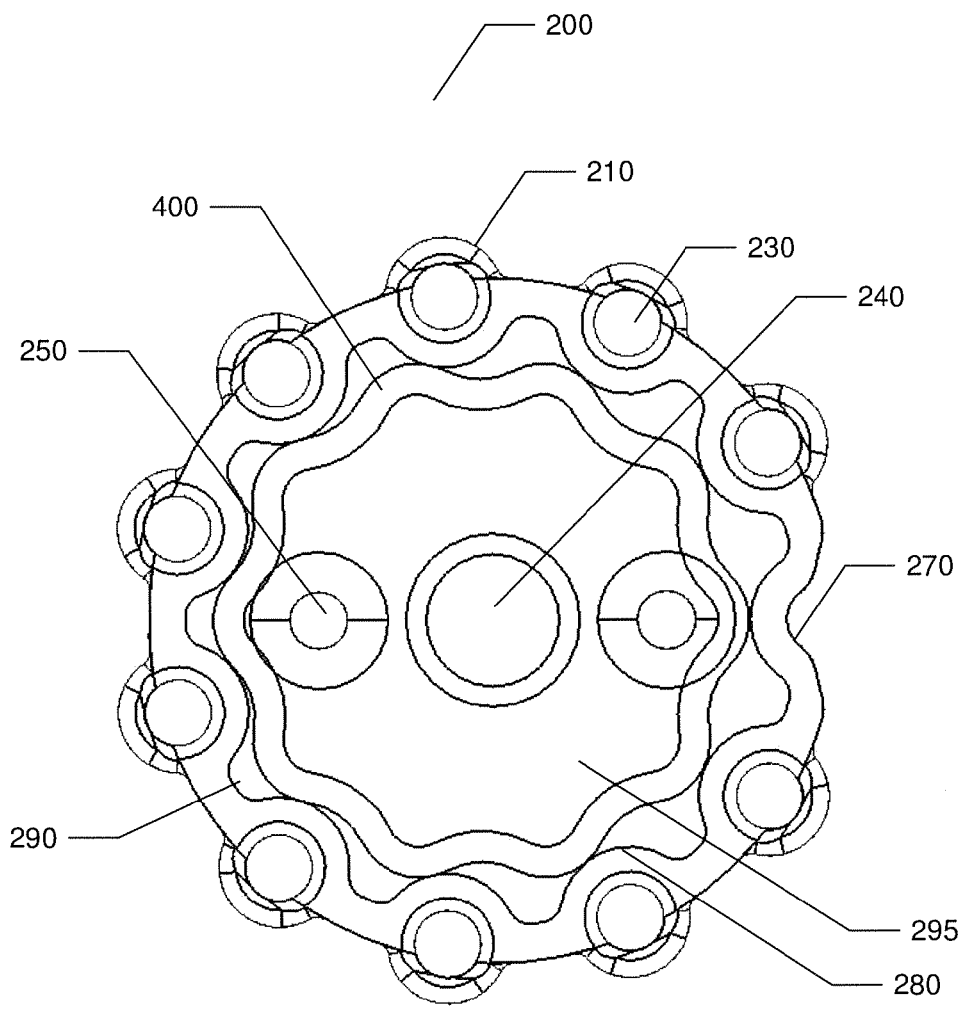
FIG. 2D is a top view drawing illustrating a stationary housing according to an embodiment of the present invention.
Figure 3A:
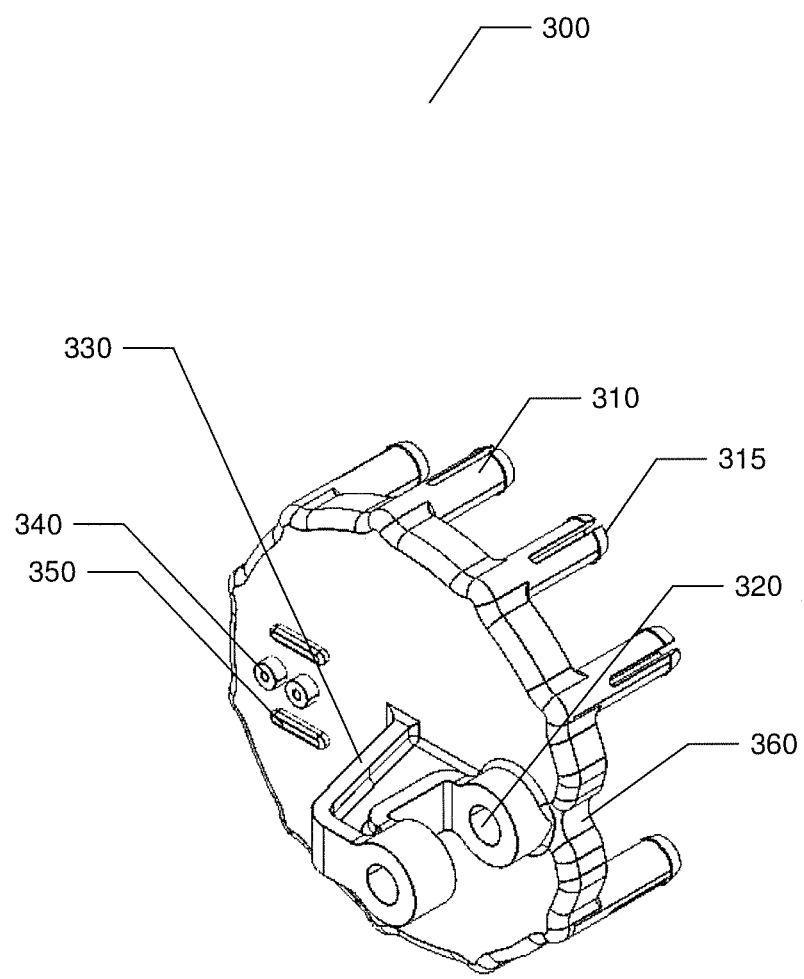
FIG. 3A is an isometric view drawing illustrating a housing cap according to an embodiment of the present invention.
Figure 3B:
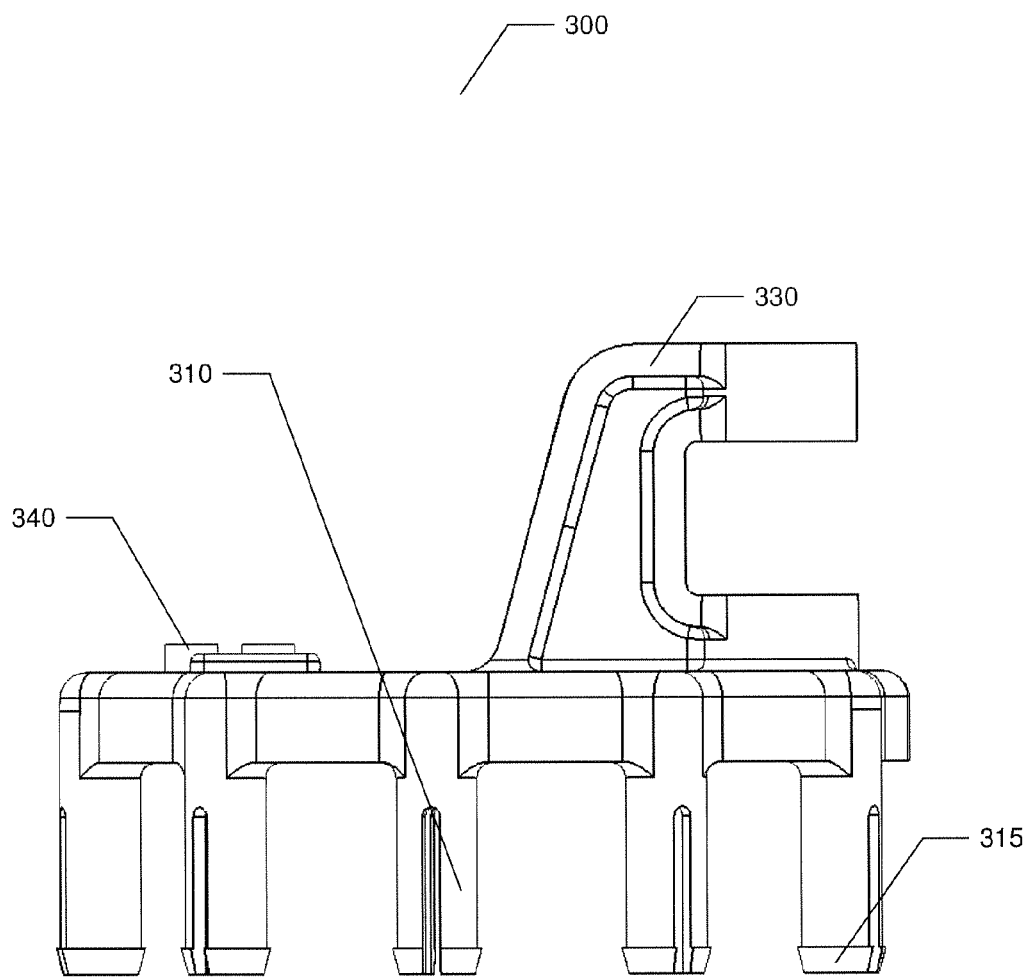
FIG. 3B is a side view drawing illustrating a housing cap according to an embodiment of the present invention.
Figure 3C:
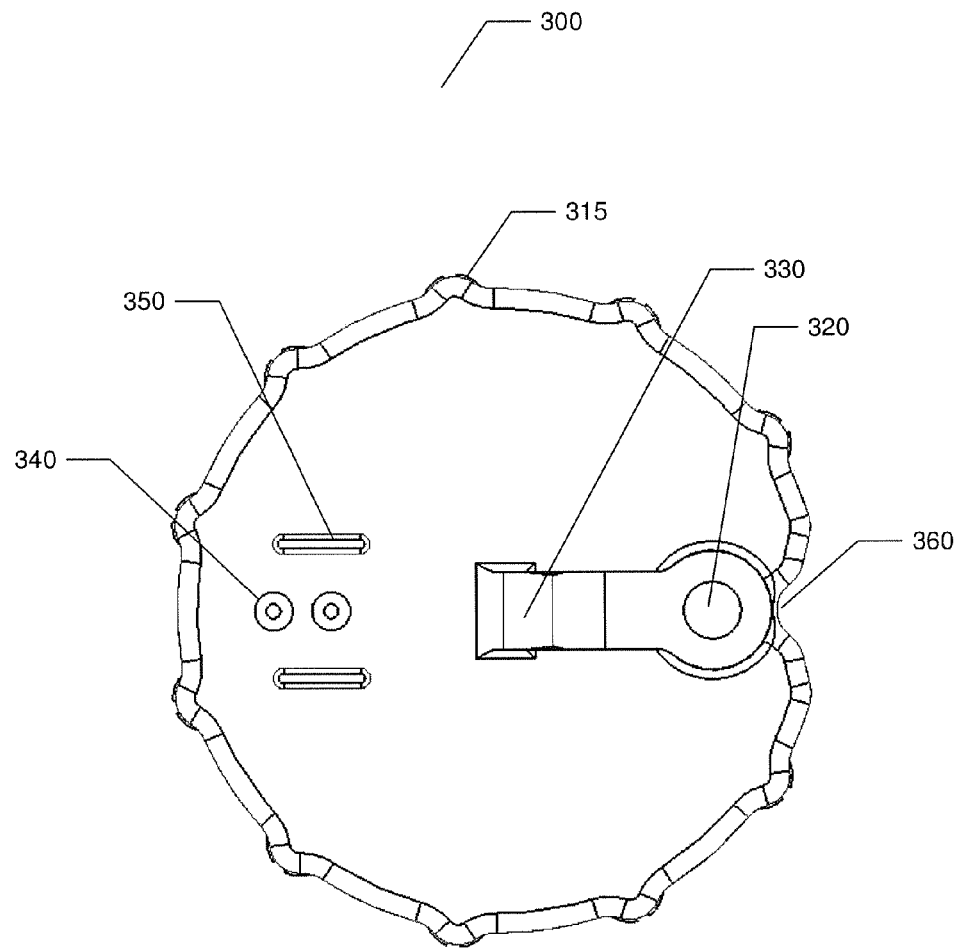
FIG. 3C is a top view drawing illustrating a housing cap according to an embodiment of the present invention.
Figure 3D:
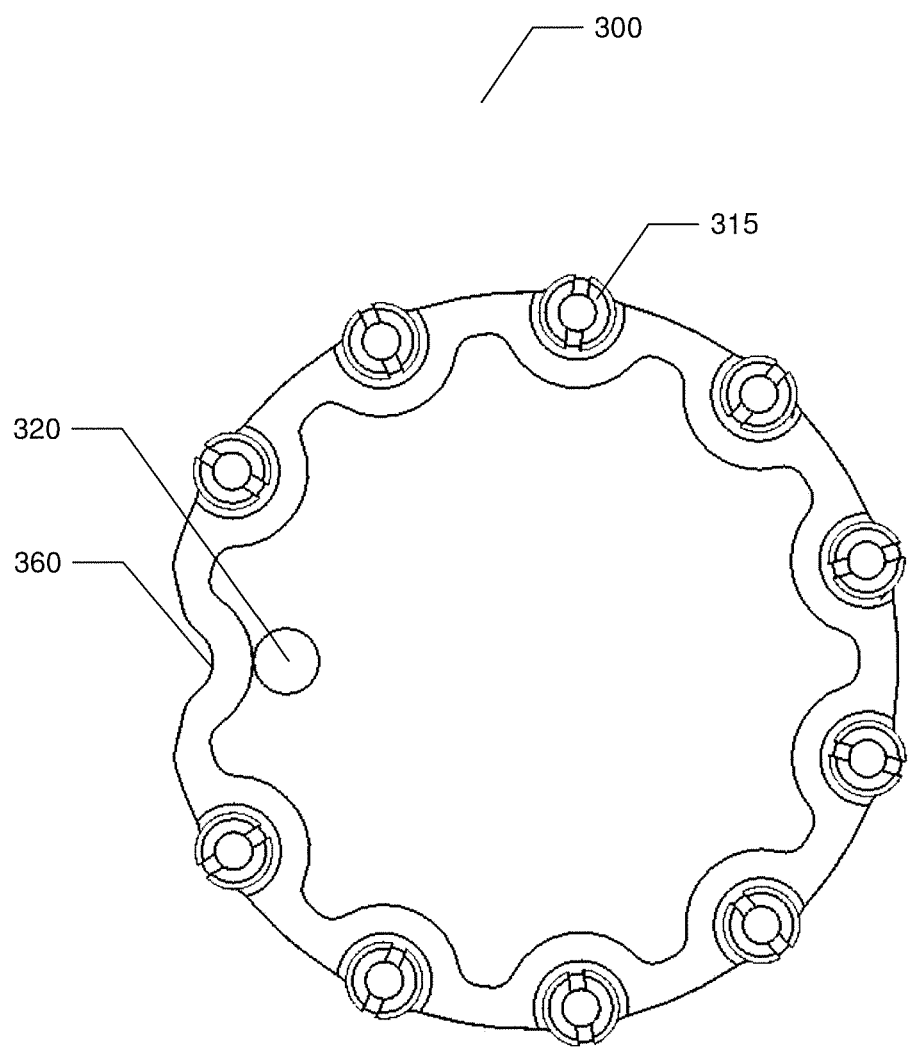
FIG. 3D is a bottom view drawing illustrating a housing cap according to an embodiment of the present invention.
Figure 4A:
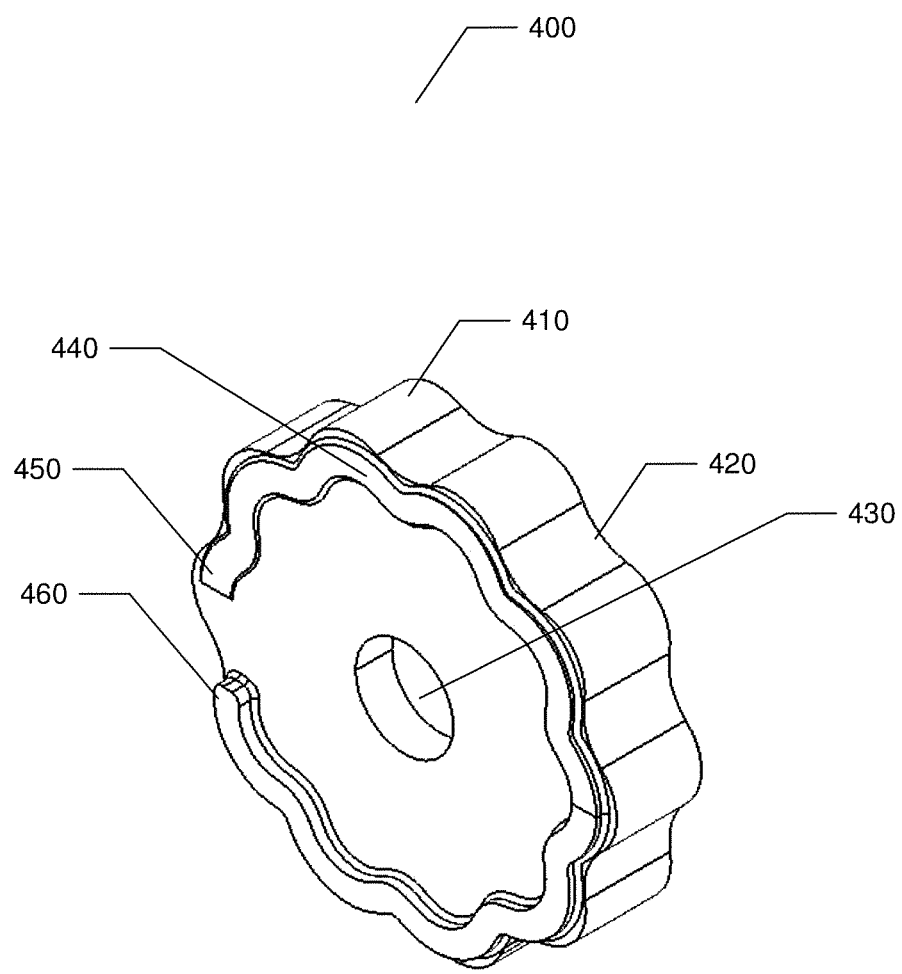
FIG. 4A is an isometric view drawing illustrating an epicycloid planet gear according to an embodiment of the present invention.
Figure 4B:
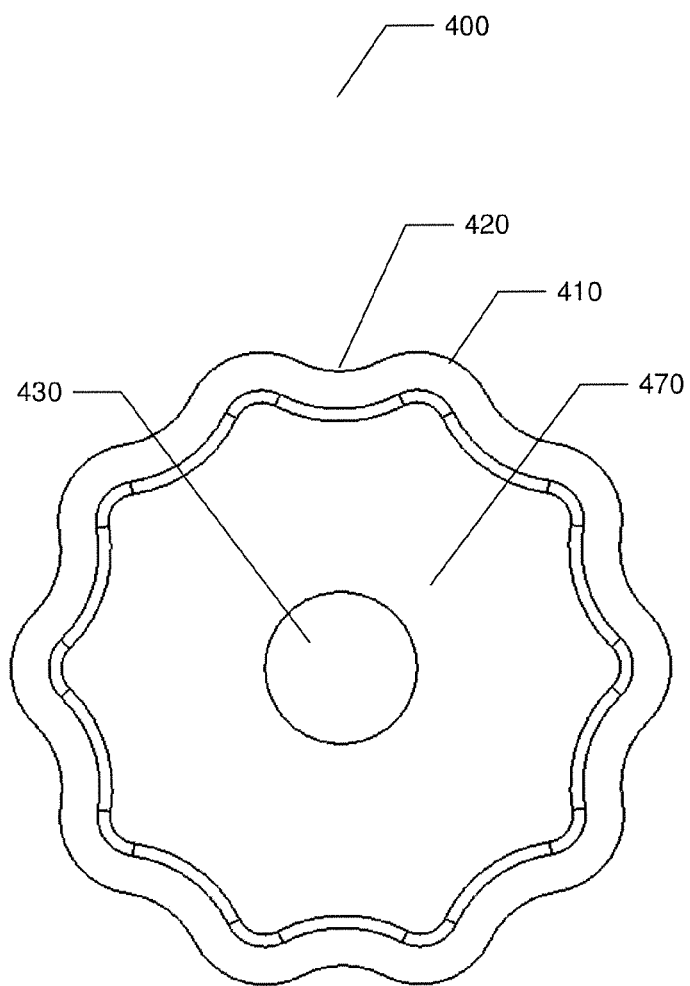
FIG. 4B is a bottom view drawing illustrating an epicycloid planet gear according to an embodiment of the present invention.
Figure 4C:
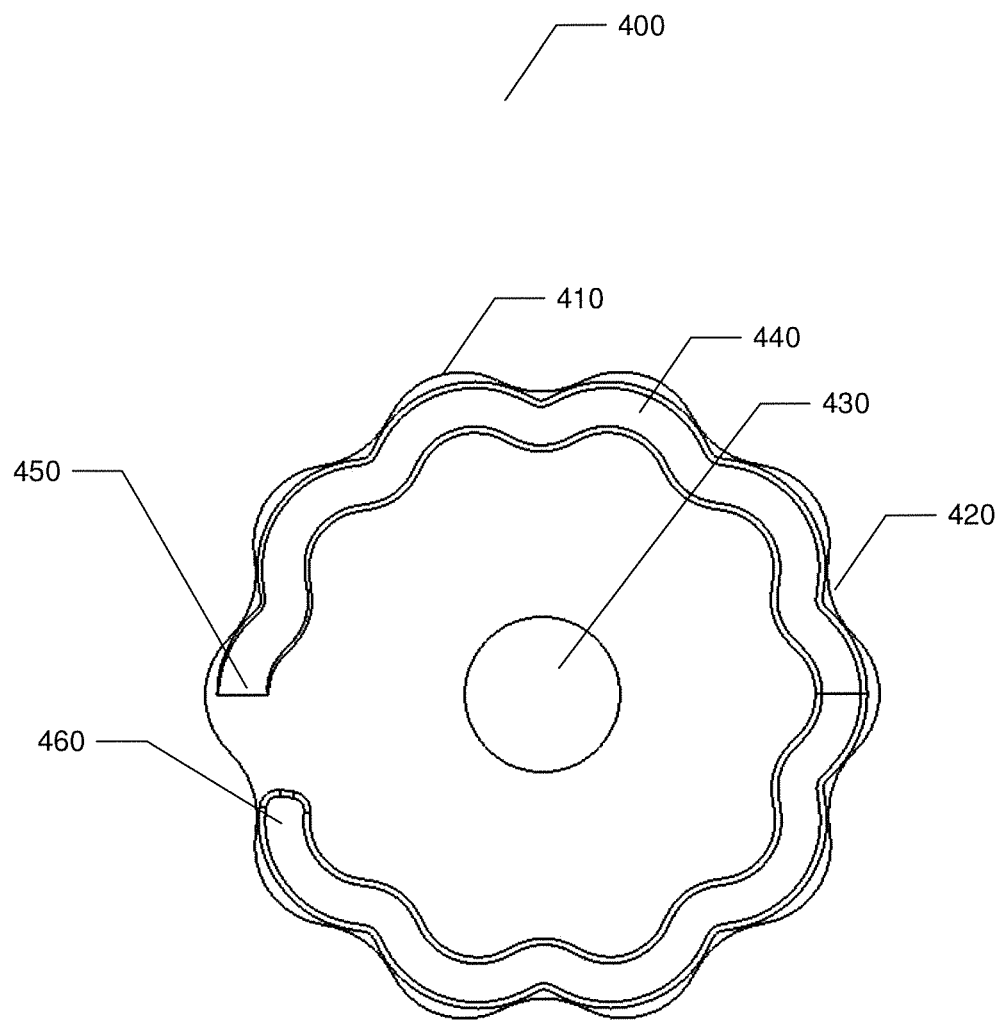
FIG. 4C is a top view drawing illustrating an epicycloid planet gear according to an embodiment of the present invention.
Figure 4D:
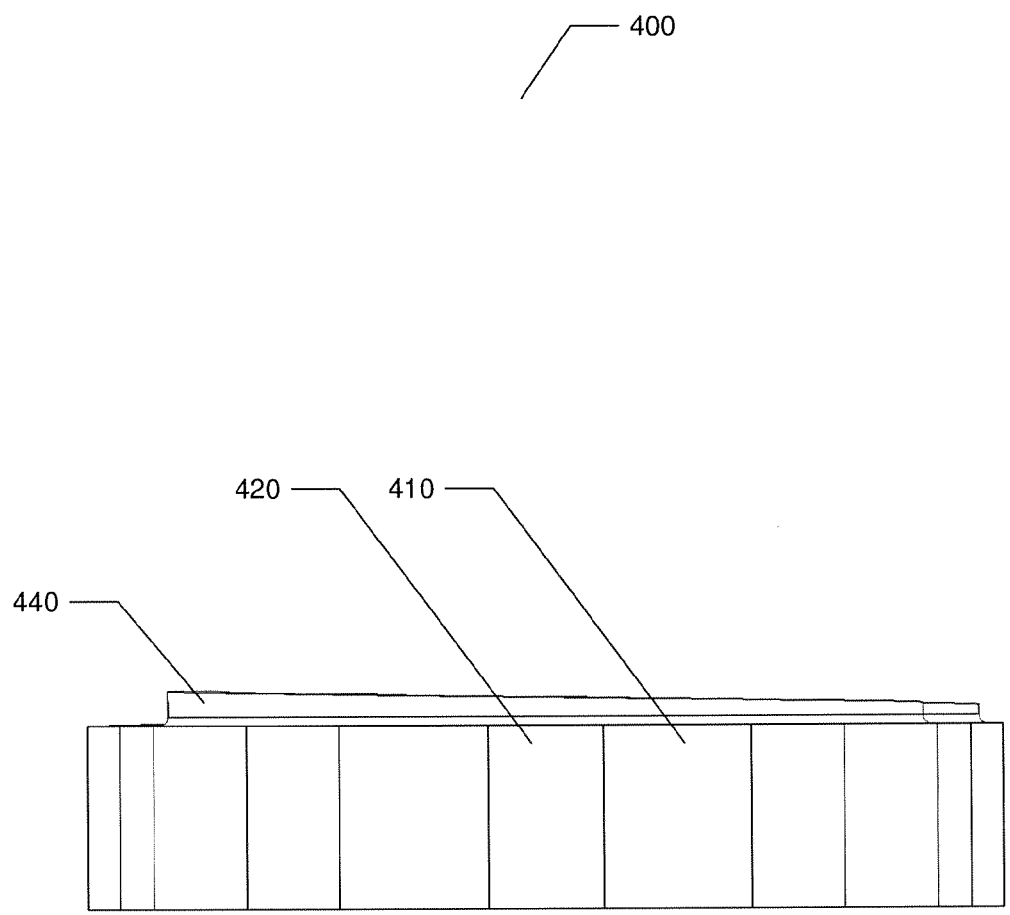
FIG. 4D is a side view drawing illustrating an epicycloid planet gear according to an embodiment of the present invention.
Figure 4E:
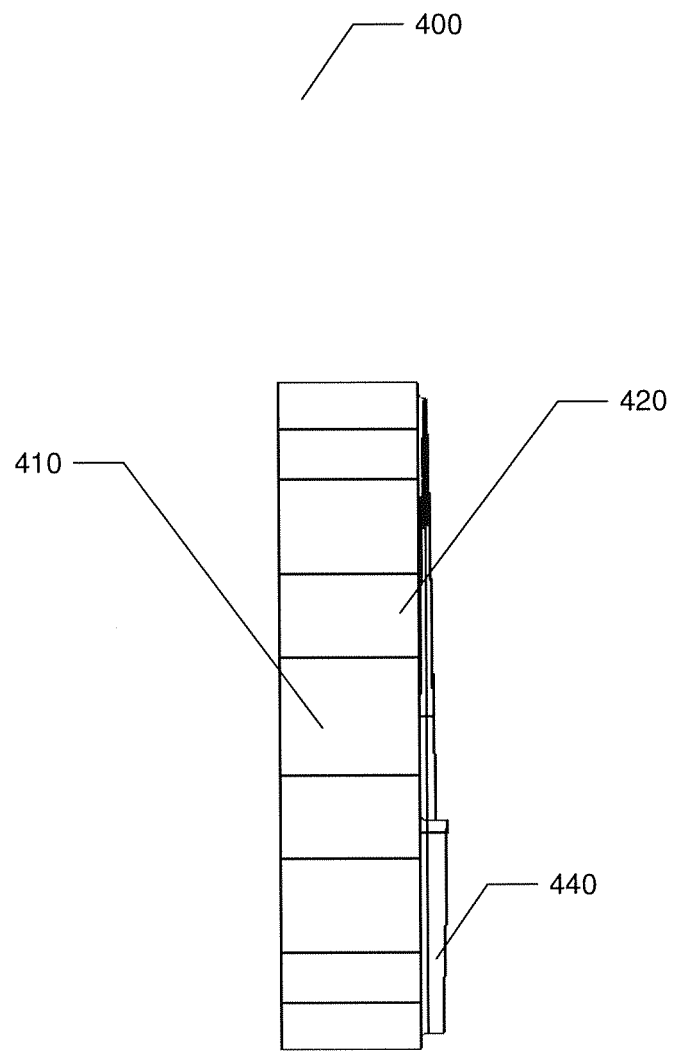
FIG. 4E is a side view drawing illustrating an epicycloid planet gear according to an embodiment of the present invention.

Reference will now be made in detail to the preferred embodiments of the present invention, examples of which are illustrated in the accompanying drawings. Wherever possible, the same reference numbers are used in the drawings and the description to refer to the same or like parts.

Refer to FIGS. 1A-1D, which are drawings illustrating an epicycloid planet gear cam according to an embodiment of the present invention.

As shown in FIGS. 1A-1D the epicycloid planet gear cam 100 of the present invention comprises a stationary housing 200, a housing cap 300, an epicycloid planet gear, a driveshaft eccentric, a cam follower pin 600, a lens carrier 700, a return leaf spring 800, and a direct current (DC) motor 900.

The stationary housing 200 comprises an internal stationary ring gear. The epicycloid planet gear and the driveshaft eccentric are assembled inside the stationary housing 200 and the housing cap 300 is assembled to the stationary housing 200 thereby encasing the epicycloid planet gear and the driveshaft eccentric inside the housing cap 300 and the stationary housing 200.

The motor shaft eccentric is fixed to a driveshaft of the DC motor 900 and freely rotates in the center hole (eccentric mounting hole) of the epicycloid planet gear. When power is applied to the DC motor 900 the driveshaft and the driveshaft eccentric will rotate and cause the epicycloid planet gear to rotate around the stationary ring gear in an opposite direction to the driveshaft rotational direction.

As the epicycloid planet gear rotates, a cam track of the epicycloid planet gear causes the cam follower pin 600 to rise and fall as the return leaf spring 800 exerts pressure to hold the cam follower pin 600 to the cam track.

Since the cam follower pin 600 is press fitted to the lens carrier 700, the lens carrier 700 moves along with the cam follower pin 600.

Refer to FIGS. 2A-2D, which are drawings illustrating a stationary housing according to an embodiment of the present invention.

The stationary housing 200 comprises a housing body 295, a plurality of housing retainers 210, a housing outer wall 220, a plurality of snap clearance holes 230, a driveshaft clearance hole 240, assembly holes 250, a housing clearance 270 for an output device, a plurality of ring gear lobes 280, and a plurality of ring gear lobe clearances 290.

The housing body 295 provides a center for the stationary housing 200 and the housing outer wall 220 is disposed around the housing body 295. The plurality of housing retainers 210 and the plurality of snap clearance holes 230 are disposed around the stationary housing 200 on the housing outer wall 220. The snap clearance holes 230 are provided to allow the housing cap to attach to the stationary housing 200.

In this embodiment of the present invention the housing cap is attached to the stationary housing 200 by inserting assembly snaps of the housing cap into the snap clearance holes 230. In other embodiments of the present invention the housing cap and the stationary housing 200 are assembled using various other methods to attach the housing cap and the stationary housing 200 together. For example, fasteners such as screws or bolts are used to secure the housing cap and the stationary housing 200 together.

The driveshaft clearance hole 240 is disposed in the body of the stationary housing 200 to allow a driveshaft of the DC motor to extend into the stationary housing 200.

The assembly holes 250 are provided for assembling the DC motor to the stationary housing 200. Fasteners through the assembly holes 250 attach the DC motor to the stationary housing 200.

A plurality of ring gear lobes 280 and a plurality of ring gear lobe clearances 290 between the ring gear lobes 280 are disposed in the interior of the stationary housing 200. The ring gear lobes 280 and ring gear lobe clearances 290 engage with cycloid lobes and cycloid lobe clearances of the epicycloid planet gear and allow the epicycloid planet gear to rotate around the interior of the stationary housing 200.

The housing clearance 270 is disposed on the housing outer wall 220 and is provided to allow clearance between the stationary housing 200 and an output device.

In an embodiment of the present invention the output device comprises a lens carrier (700 FIG. 1A-1D).

In other embodiments the output device comprises devices requiring linear movement from a rotational source. For example, the output device is a machining tool, a stamping machine, a sewing machine, a reciprocating tool, a reciprocating saw, an engaging/disengaging lock, etc.

Refer to FIGS. 3A-3D, which are drawings illustrating a housing cap according to an embodiment of the present invention.

The housing cap 300 of the present invention comprises a plurality of assembly snaps 310, a plurality of snap details 315, a cam follower clearance hole 320, a cam follower support bracket 330, leaf spring retainer holes 340, leaf spring tracks 350, and a cap clearance 360 for an output device.

The plurality of assembly snaps 310 are disposed around the housing cap 300 and are provided for assembling the housing cap 300 and the stationary housing together. The plurality of assembly snaps 310 are slotted to allow the assembly snaps 310 to compress and expand during assembly and disassembly.

Each of the assembly snaps 310 further comprises a snap detail 315. The snap detail comprises, for example, a flange, a hook, or a wedge.

During assembly the plurality of assembly snaps 310 are inserted into the plurality of snap clearance holes of the stationary housing and the plurality of snap details 315 grasp the plurality of housing retainers of the stationary housing thereby holding the stationary housing and the housing cap 300 together.

Disposed on the top of the housing cap 300 is the cam follower support bracket 330. The cam follower clearance hole 320 in the cam follower support bracket 330 allows the cam follower pin to travel up and down through the cam follower clearance hole 320.

Also disposed on top of the housing cap 300 are the leaf spring retainer holes 340 and the leaf spring tracks 350. The leaf spring tracks 350 are provided for aligning the return leaf spring in the correct position with the cam follower support bracket 330 and the cam follower pin. The leaf spring retainer holes 340 allow the return leaf spring to be assembled to the housing cap 300.

The cap clearance 360 is disposed on the exterior sidewall of the housing cap 300 and is provided to allow clearance between the housing cap 300 and an output device.

In an embodiment of the present invention the output device comprises a lens carrier (700 FIG. 1A-1D).

In other embodiments the output device comprises devices requiring linear movement from a rotational source.

Refer to FIGS. 4A-4E, which are drawings illustrating an epicycloid planet gear according to an embodiment of the present invention.

The epicycloid planet gear 400 of the present invention comprises a plurality of cycloid lobes 410, a plurality of cycloid lobe clearances 420, an eccentric mounting hole 430, a cam track 440, a cam track start 450, a cam track end 460, a cycloid body 470, and a cycloid base 480.

The plurality of cycloid lobes 410 is disposed around the outer edge of the cycloid body 770. Between each cycloid lobe 410 is a cycloid lobe clearance 420. The cycloid lobes 410 and the cycloid lobe clearances 420 engage with the ring gear lobes and ring gear lobe clearances of the stationary housing and allow the epicycloid planet gear to rotate around the interior of the stationary housing.

The eccentric mounting hole 430 is provided to allow the epicycloid planet gear eccentric driver of the driveshaft eccentric to cause rotational movement of the epicycloid planet gear 400 in standard cycloid drive fashion. It should be noted that the epicycloid planet gear 400 is not attached to the driveshaft eccentric and the epicycloid planet gear eccentric driver is only positioned into the eccentric mounting hole 430 of the epicycloid planet gear 400.

In this embodiment of the present invention the cam track 440 is a raised cam track 440.

The cam track 440 is disposed on the top surface of the cycloid body 470. The cam track 440 comprises a raised surface around the epicycloid planet gear 400 that gradually increases in height away from the top surface of the cycloid body 470. At the cam track start 450 the height of the cam track 440 is at its lowest height and at the cam track end 460 the height of the cam track 400 is at its highest height.

When assembled, the cam follower contact surface of the cam follower pin contacts the cam track 440 and the return leaf spring provides pressure downwards on the cam follower pin to push the cam follower contact surface down on the cam track 440. As the epicycloid planet gear 400 rotates, the cam track 440 causes the cam follower pin to move in relation to the height of the cam track 440. For example, as the cam track 440 increases in height the cam follower pin rises and as the cam track 440 decreases in height the cam follower pin lowers.

In an embodiment of the present invention the cam track 440 gradually increases in height and comprises a cam track start 450 and a cam track end 460.

In other embodiments of the present invention the cam track 440 comprises other designs. For example, the cam track 440 gradually increases and decreases in height around the epicycloid planet gear 400 in an uninterrupted path causing the cam follower pin to gradually and continually raise and lower. Or for example, the cam track 440 increases and decreases in height multiple times around the epicycloid planet gear 400 causing the cam follower pin to continually raise and lower at a faster speed.

As a result, the epicycloid planet gear cam of the present invention can be used in or adapted to numerous applications by simply changing the epicycloid planet gear cam with another cam track pattern.

Additionally, controlling the rotational direction of the driveshaft can affect the movement of the cam follower pin. For example, if the driveshaft continues to rotate in one direction the cam follower pin will repeatedly move in relation to the cam track 440 height pattern over and over again in a cycle. However, if the rotational direction of the driveshaft turns in one direction and then in the opposite direction different movement patterns of the cam follower pin can be achieved. For example, utilizing the cam track 440 of FIGS. 4A-4E comprising a cam track start 450 and a cam track end 460, the driveshaft can be made to rotate in one direction until the cam follower pin nears the cam track end 460 and then the driveshaft can be made to rotate in the opposite direction until the cam follower pin nears the cam track start 450. In this way, the rotational direction of the driveshaft can control the position of the cam track 440 thereby controlling the movement of the cam follower pin and the positioning of the lens carrier. Furthermore, incremental changes in rotational direction of the driveshaft provides for accurate positioning of the cam follower pin. For example, in an auto-focusing application the lens carrier can be accurately controlled by controlling the rotational direction of the driveshaft.

Figure 5A:
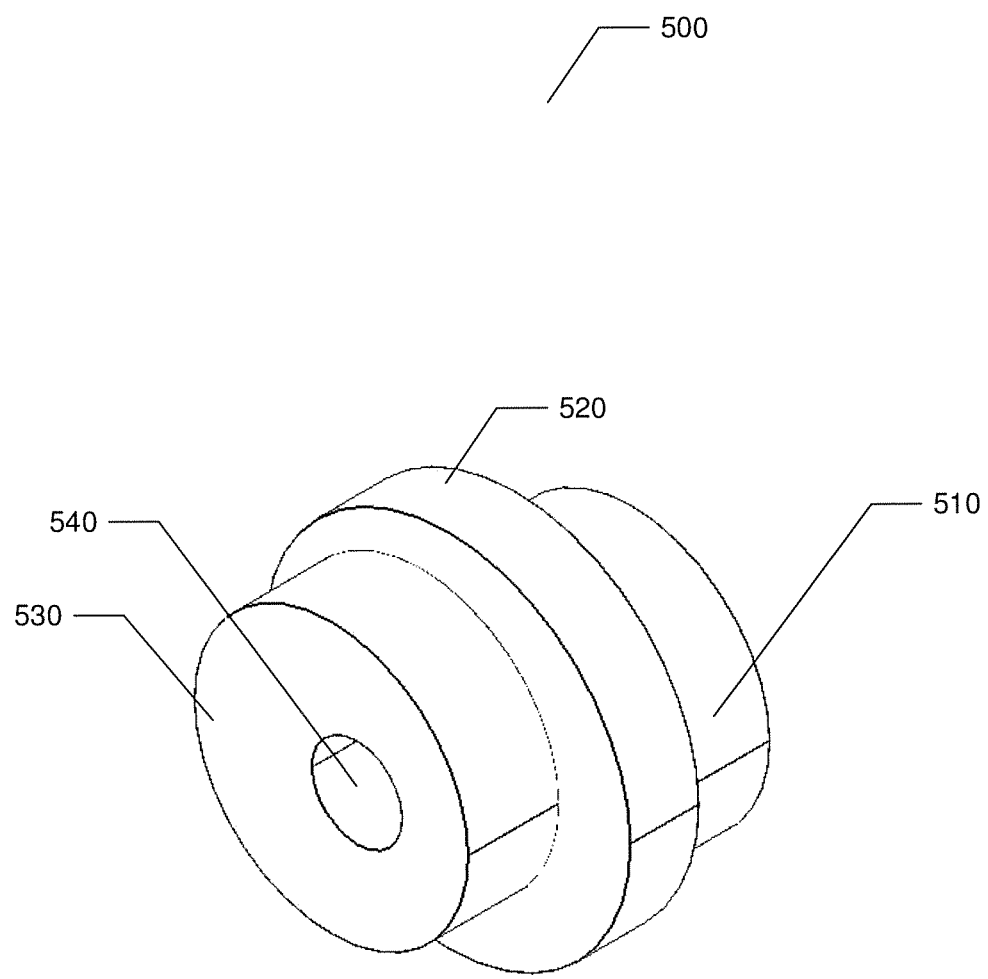
FIG. 5A is an isometric view drawing illustrating a driveshaft eccentric according to an embodiment of the present invention.
Figure 5B:
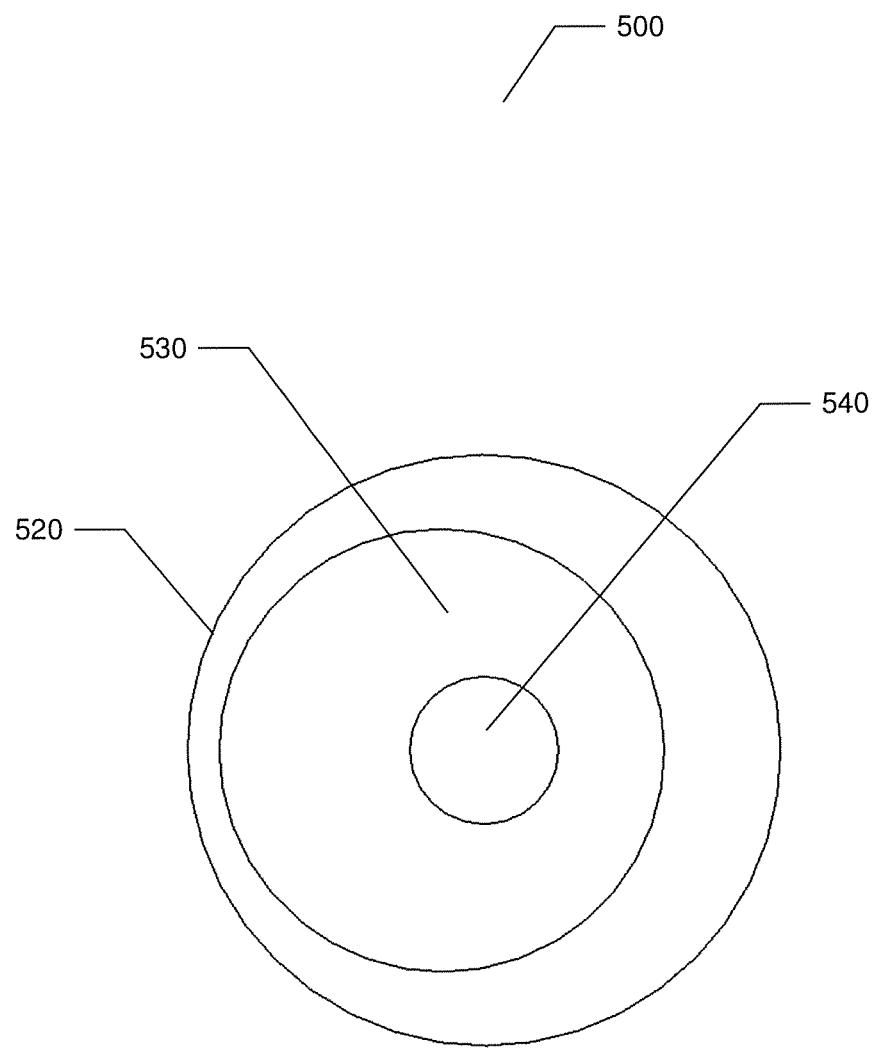
FIG. 5B is a top view drawing illustrating a driveshaft eccentric according to an embodiment of the present invention.
Figure 5C:
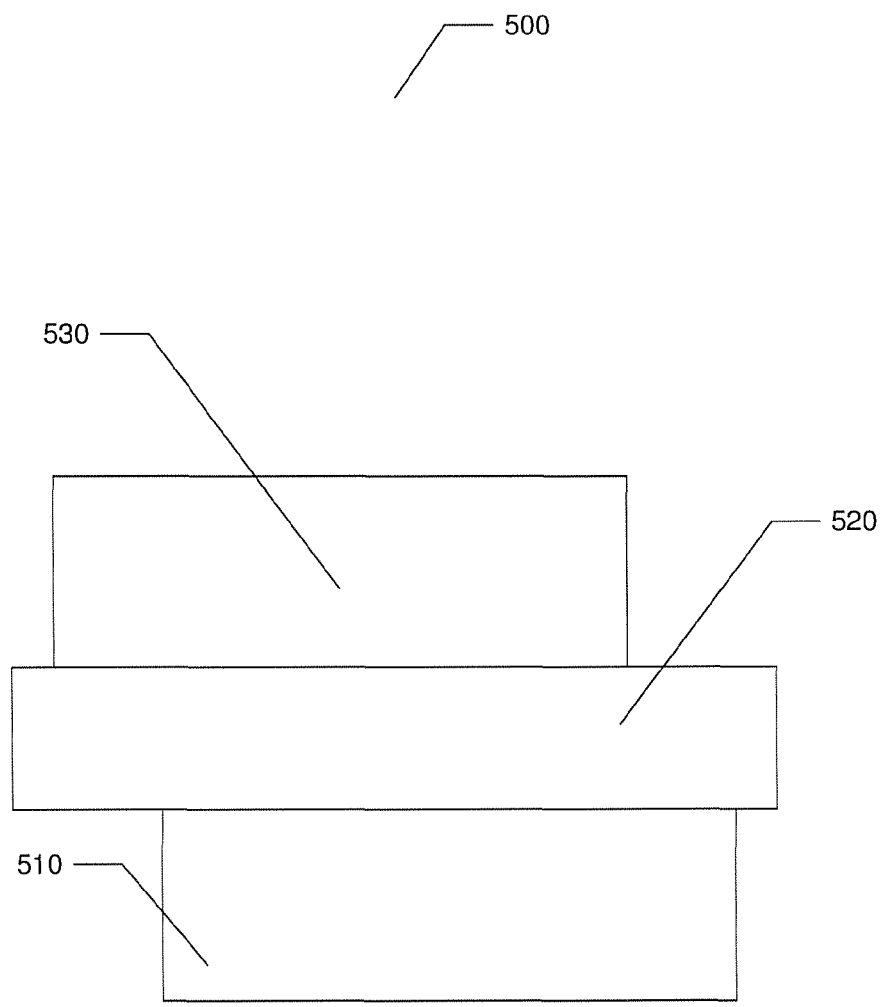
FIG. 5C is a side view drawing illustrating a driveshaft eccentric according to an embodiment of the present invention.

Refer to FIGS. 5A-5C, which are drawings illustrating a driveshaft eccentric according to an embodiment of the present invention.

The driveshaft eccentric 500 of the present invention comprises an epicycloid planet gear eccentric driver 510, a cycloid mounting disc 520, an eccentric driver counterbalance 530, and an eccentric hole 540.

During assembly the epicycloid planet gear eccentric driver 510 is positioned in the eccentric mounting hole of the epicycloid planet gear. It should be noted that the driveshaft eccentric 500 is not attached to the epicycloid planet gear and the epicycloid planet gear eccentric driver 510 freely rotates inside the eccentric mounting hole of the epicycloid planet gear.

Since the epicycloid planet gear is not attached to the driveshaft eccentric 500 the cycloid mounting disc 520 is provided for supporting the epicycloid planet gear and maintaining the epicycloid planet gear eccentric driver 510 inside the eccentric mounting hole of the epicycloid planet gear.

The eccentric driver counterbalance 530 is disposed on the opposite side of the cycloid mounting disc 520 as the epicycloid planet gear eccentric driver 510. Further, the eccentric driver counterbalance 530 is positioned at a half-rotation relative to the epicycloid planet gear eccentric driver 510. The eccentric driver counterbalance 530 provides a counterbalance to the epicycloid planet gear eccentric driver 510 to reduce vibration.

The eccentric hole 540 is provided to assemble the driveshaft eccentric 500 to a driveshaft, for example the driveshaft of the DC motor.

Figure 6:
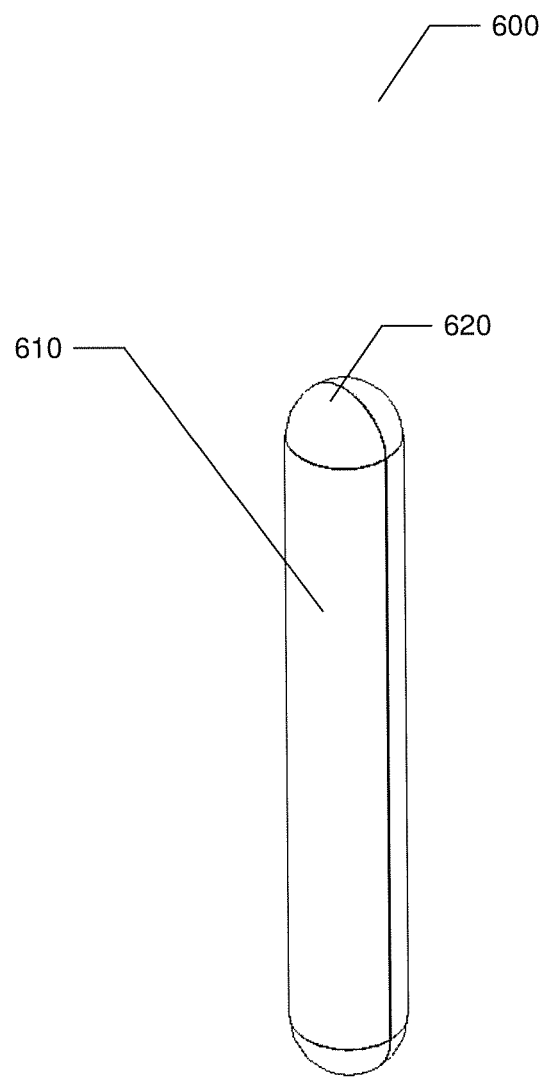
FIG. 6 is an isometric view drawing illustrating a cam follower pin according to an embodiment of the present invention.

Refer to FIG. 6, which is an isometric view drawing illustrating a cam follower pin according to an embodiment of the present invention.

The cam follower pin 600 of the present invention comprises a cam follower body 610 and a cam follower contact surface 620.

During assembly the cam follower body 610 is assembled in the cam follower press fit hole of the lens carrier and the cam follower pin 600 is fixed with the lens carrier.

As the epicycloid planet gear rotates the cam follower contact surface 620 of the cam follower pin 600 contacts the cam track of the epicycloid planet gear and moves in relation to the cam track. At the cam track start the height of the cam track is at its lowest point and the cam follower pin 600 is at its lowest position. As the epicycloid planet gear rotates the height of the cam track increases causing the cam follower pin 600 to rise. When the cam follower pin 600 reaches the cam track end the cam track is at its highest height and the cam follower pin 600 is at is highest position. Since the cam follower pin 600 is fixed to the output device, the lens carrier, the output device will move along with the cam follower pin 600.

Figure 7A:
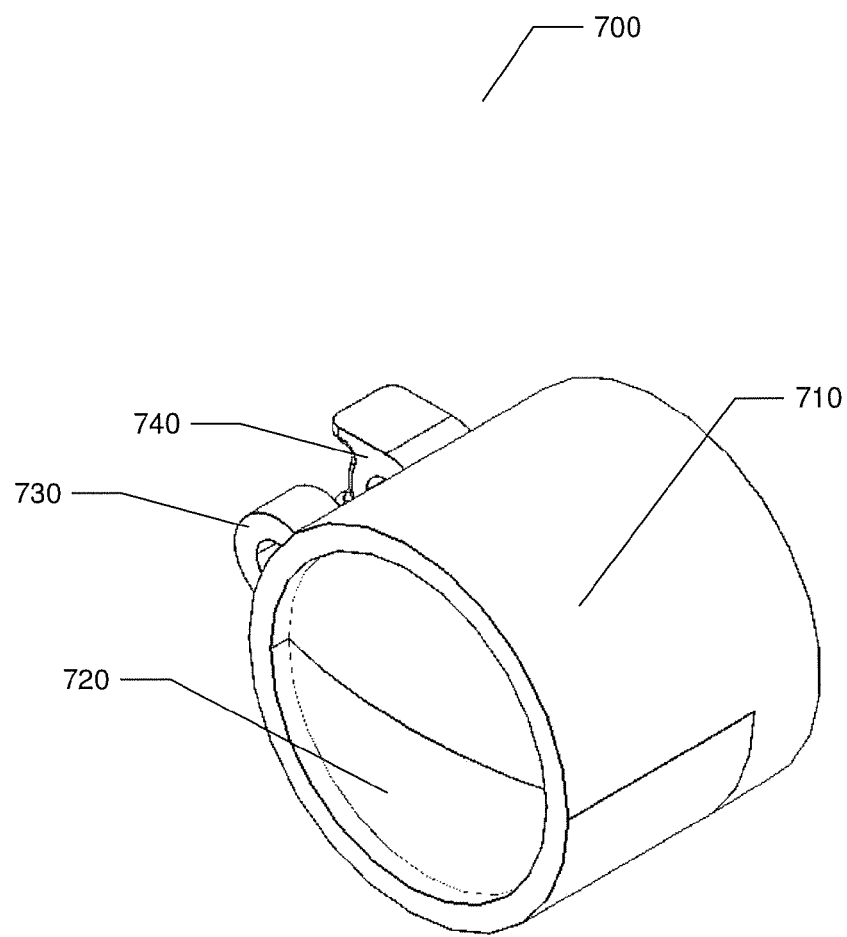
FIG. 7A is an isometric view drawing illustrating a lens carrier according to an embodiment of the present invention.
Figure 7B:
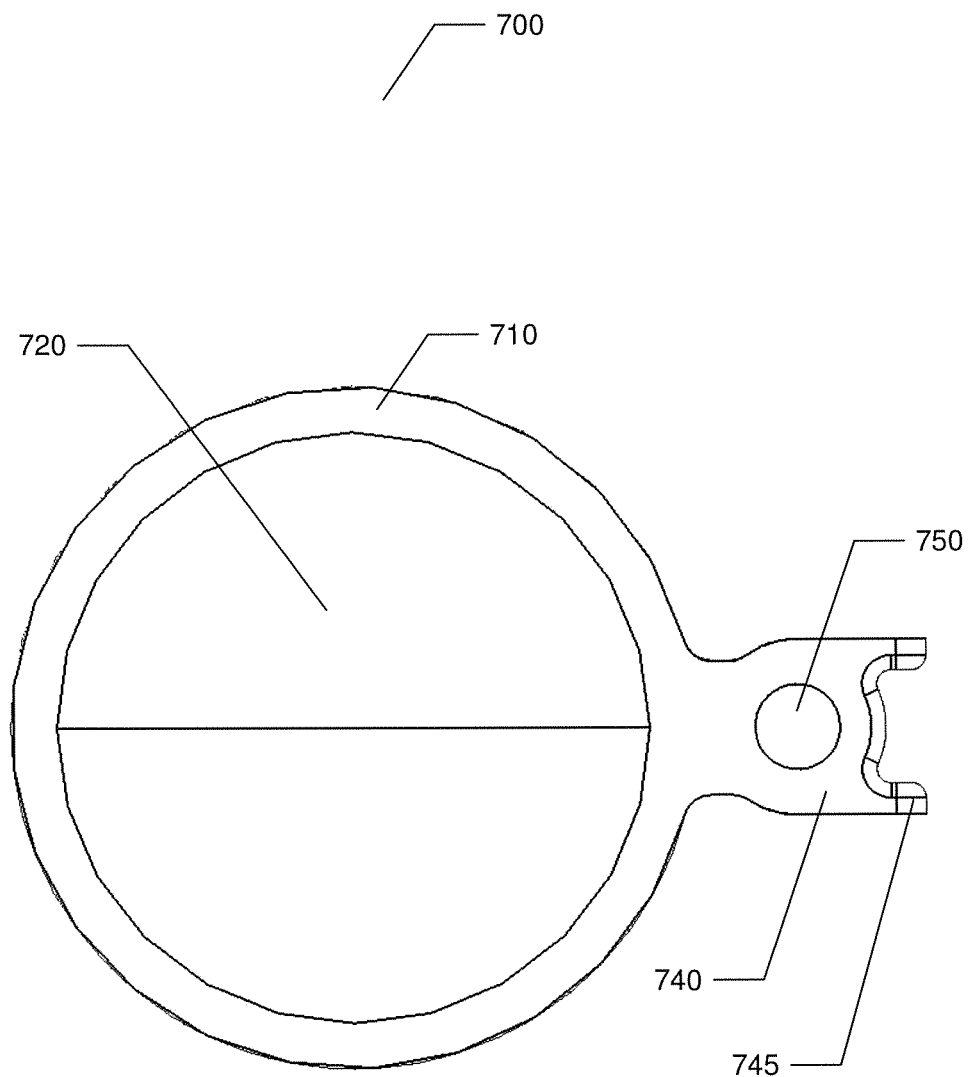
FIG. 7B is a bottom view drawing illustrating a lens carrier according to an embodiment of the present invention.

Refer to FIGS. 7A-7B, which are drawings illustrating a lens carrier according to an embodiment of the present invention.

In an embodiment of the present invention the output device connected to and moving along with movement of the cam follower pin comprises a lens carrier.

In other embodiments of the present invention the output device comprises other devices requiring linear movement from a rotational source.

The lens carrier 700 of the present invention comprises a lens body 710, a lens 720, a top mount 730, a bottom mount 740, an anti-rotation feature 745, and a cam follower press fit hole 750.

The lens 720 is assembled inside the lens body 710. The lens comprises, for example, a focus lens for a camera.

The top mount 730 and the bottom mount 740 are disposed on the outer sidewall of the lens body 710.

The cam follower press fit hole 750 extends through the top mount 730 and the bottom mount 740. The cam follower press fit hole 750 is provided for press fitting the cam follower pin to attach the lens carrier 700 to the cam follower pin.

The bottom mount 740 further comprises an anti-rotation feature 745. When the lens carrier 700 is assembled to the cam follower pin, the lens carrier 700 moves with the cam follower pin and the anti-rotation feature 745 slides along the cam follower support bracket of the housing cap. As the lens carrier 700 moves the arms of the anti-rotation feature 745 closely but freely hug the cam follower support bracket and the lens carrier is prevented from rotating.

Figure 8A:
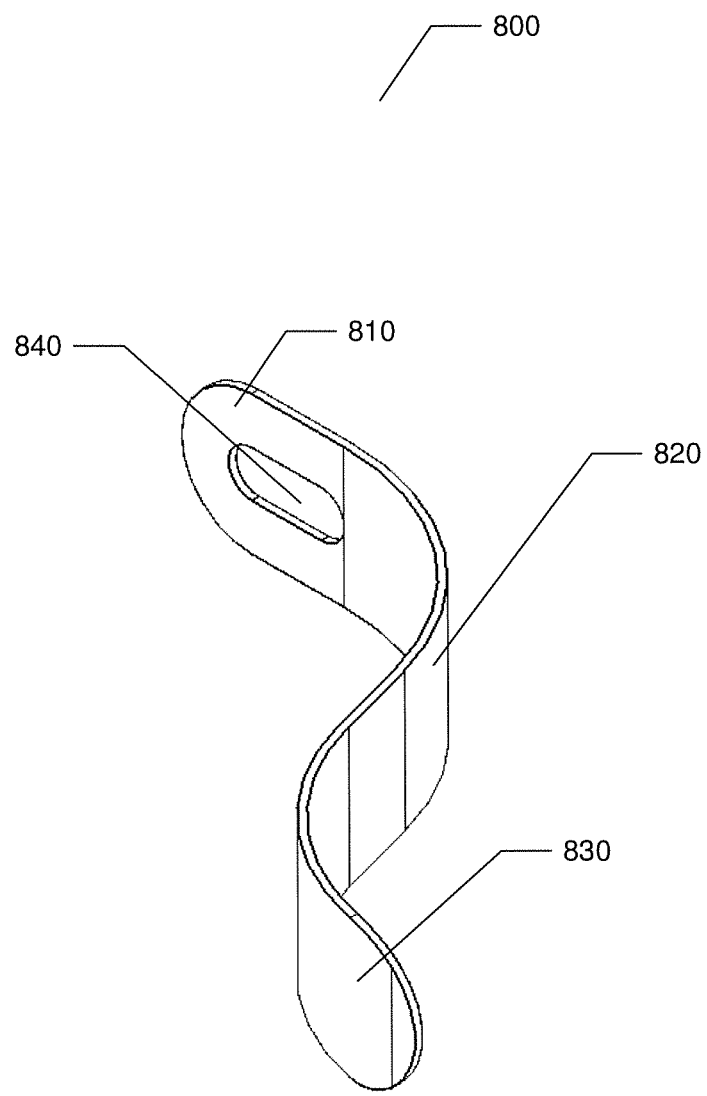
FIG. 8A is an isometric view drawing illustrating a return leaf spring according to an embodiment of the present invention.
Figure 8B:
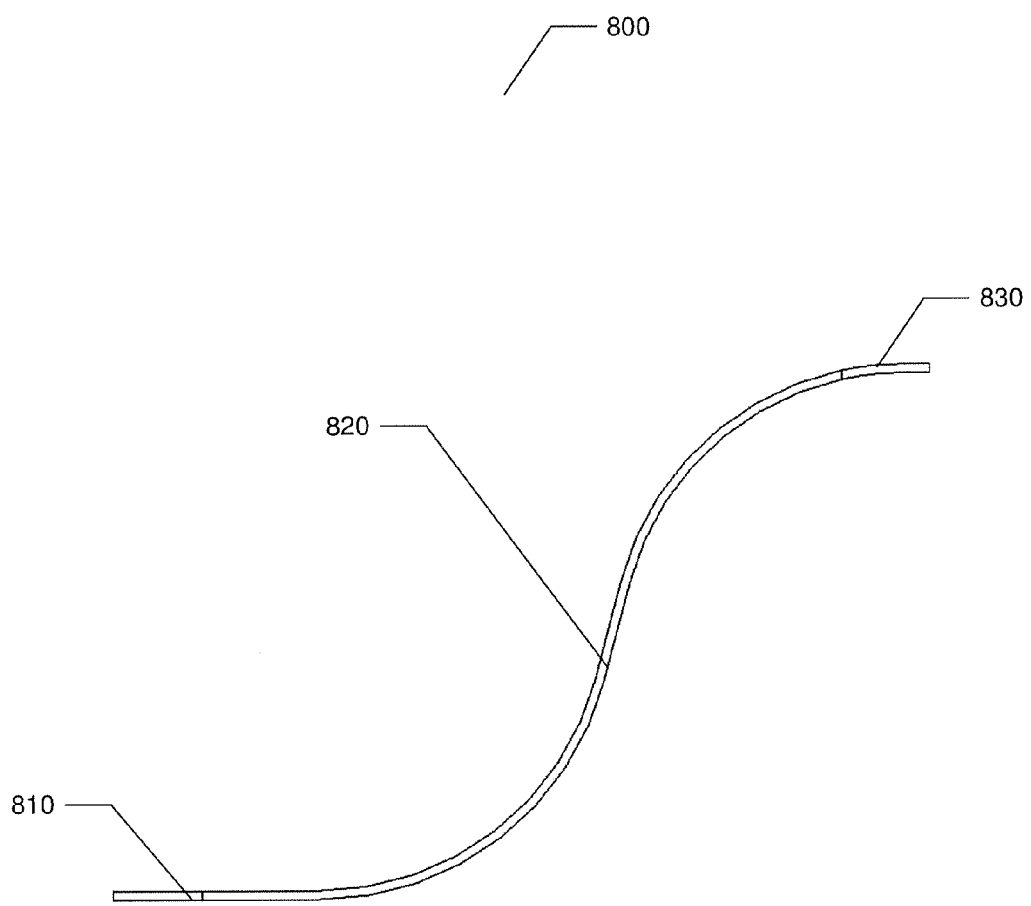
FIG. 8B is a side view drawing illustrating a return leaf spring according to an embodiment of the present invention.

Refer to FIGS. 8A-8B, which are drawings illustrating a return leaf spring according to an embodiment of the present invention.

The return leaf spring 800 of the present invention comprises a spring base 810, a spring body 820, a spring tip 830, and a spring mounting hole 840.

The return leaf spring 800 comprises an S-shaped flexible material with the spring body 820 disposed between the spring base 810 and the spring tip 830.

The spring mounting hole 840 is provided in the spring base 810 to allow the return leaf spring 800 to be assembled to the leaf spring retainer holes of the housing cap.

After the spring base 810 of the return leaf spring 800 is assembled to the housing cap, the spring tip 830 contacts the top of the cam follower pin. As the cam follower pin rises, the return leaf spring 800 flexes while providing a small oppositional force downward on the cam follower pin. When the cam follower pin lowers, the return leaf spring 800 continues to push downward on the cam follower pin as the return leaf spring 800 returns to its original state. For example, as the cam follower pin follows the cam track of the epicycloid planet gear until the track end, when the cam follower pin passes the track end the return leaf spring 800 will immediately push the cam follower pin downward to the cycloid body of the epicycloid planet gear.

Figure 9A:
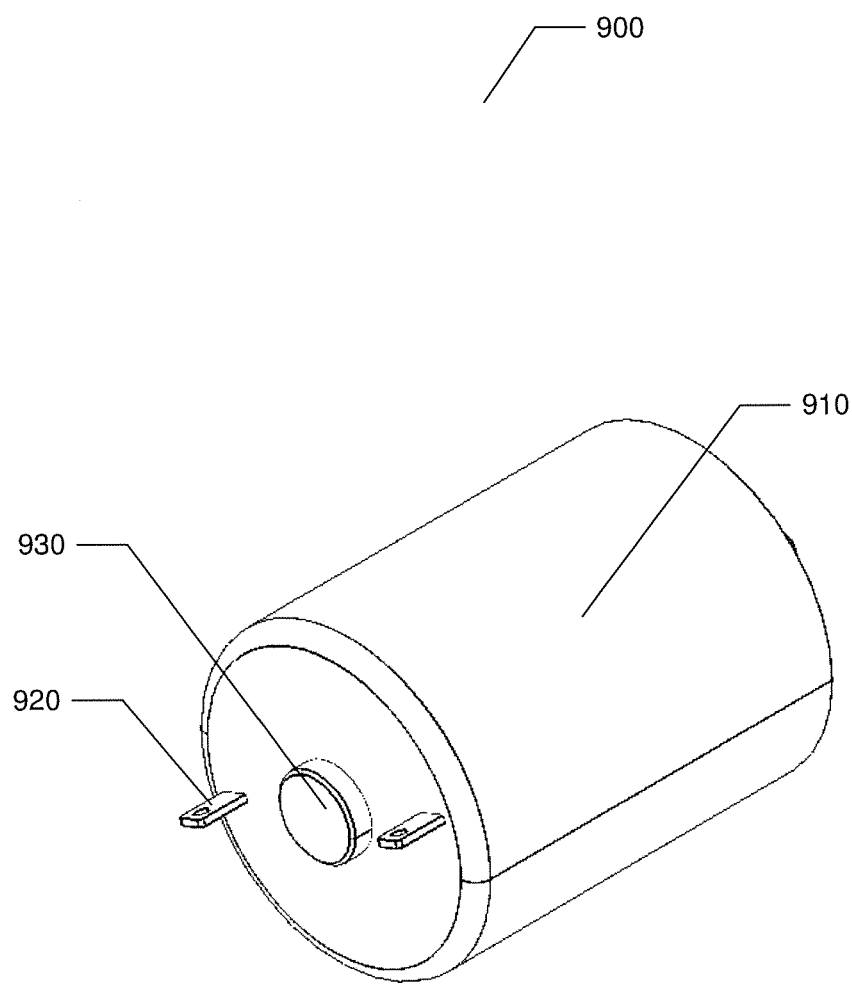
FIG. 9A is an isometric view drawing illustrating a direct current motor according to an embodiment of the present invention.
Figure 9B:
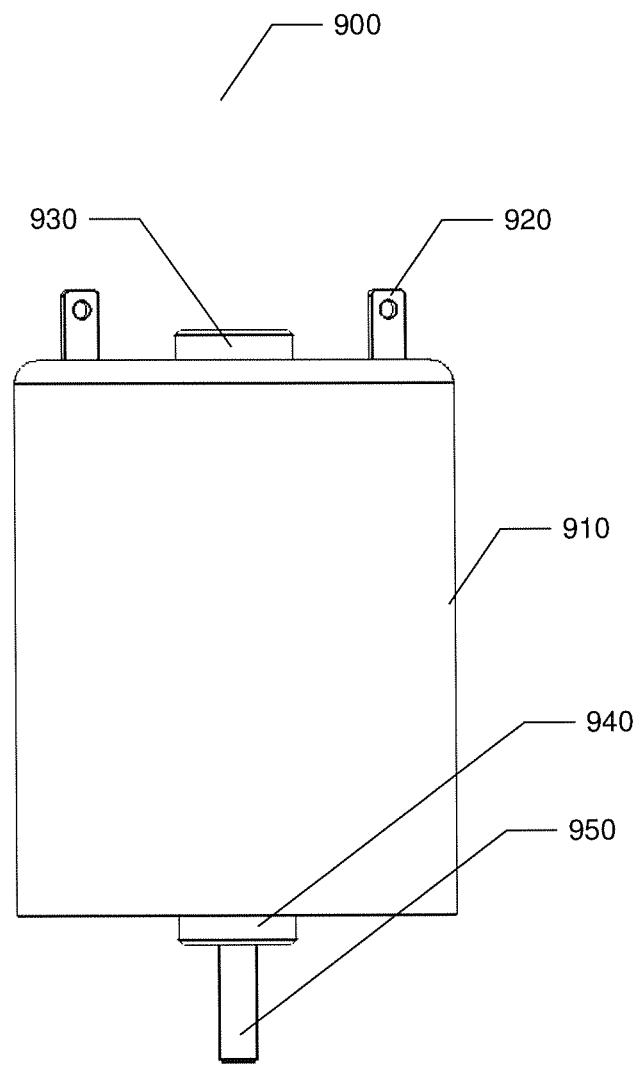
FIG. 9B is a side view drawing illustrating a direct current motor according to an embodiment of the present invention.
Figure 9C:
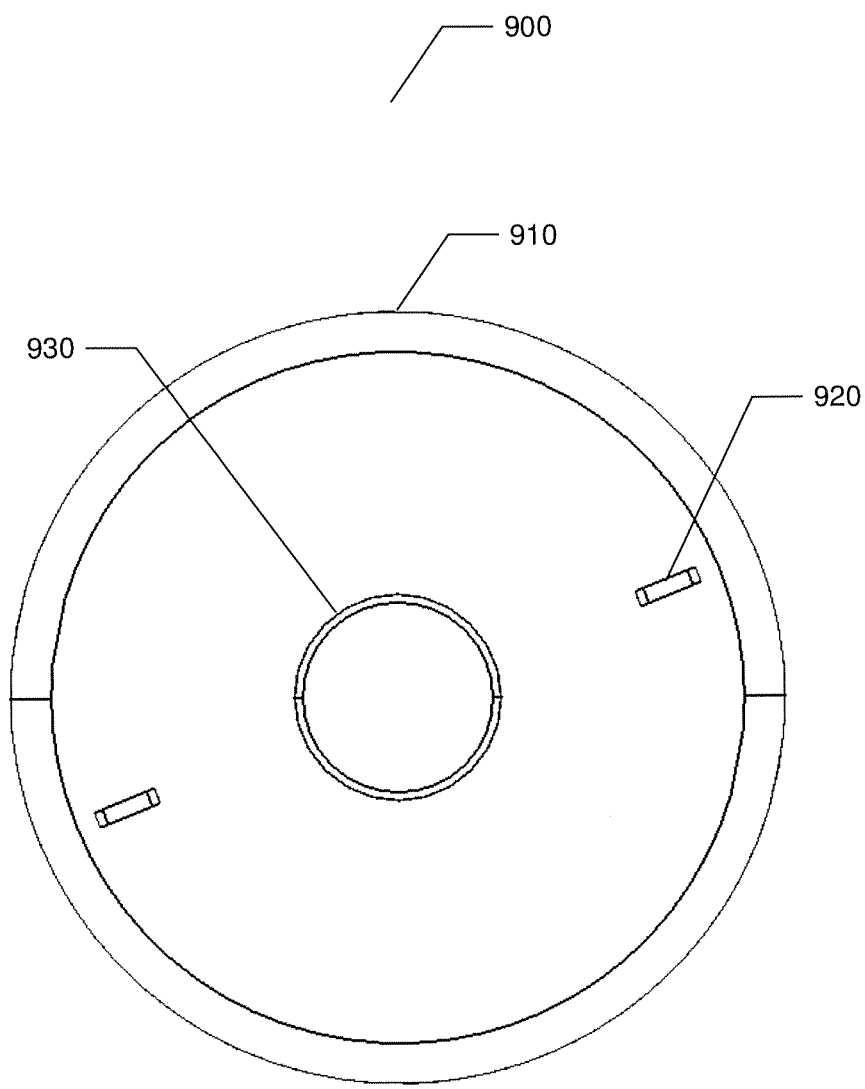
FIG. 9C is a bottom view drawing illustrating a direct current motor according to an embodiment of the present invention.

Refer to FIGS. 9A-9C, which are drawings illustrating a direct current motor according to an embodiment of the present invention.

The direct current (DC) motor 900 of the present invention comprises a motor housing 910, contacts 920, a motor base 930, a motor top 940, and a driveshaft 950.

The motor base 930 and the contacts 920 are disposed on one end of the motor housing 910 and the motor top 940 and the driveshaft 950 are disposed on the opposite end of the DC motor 900.

The contacts 920 comprise electrical contact for electrically coupling with a DC power supply to allow DC power to be applied to the DC motor 900.

When power is applied to the DC motor 900 the driveshaft 950 will rotate. Since the driveshaft eccentric is attached to the driveshaft 950, rotation of the driveshaft 950 causes the driveshaft eccentric to rotate.

Refer to FIGS. 10A-10F, which are drawings illustrating an epicycloid planet gear with slotted cam track according to an embodiment of the present invention.

In the embodiment of the present invention illustrated in FIGS. 10A-10F the epicycloid planet gear 400 comprises a slotted cam track 440. The cam track 440 comprises a recessed slot or groove disposed in the top surface of the cycloid body 470. The cam track 440 comprises a recessed slot around the epicycloid planet gear 400 that gradually increases or decreases in distance from the center of the epicycloid planet gear 400.

When assembled, the cam follower contact surface 620 of the cam follower pin 600 is positioned in the slotted cam track 440. As the epicycloid planet gear 400 rotates, the cam track 440 causes the cam follower pin to move in relation to the distance of the cam track 440 from the center of the epicycloid planet gear. For example, as the recessed slot of the cam track 440 decreases in distance from the center of the epicycloid planet gear 400 (moves toward the eccentric mounting hole 430) the cam follower contact surface 620 of the cam follower pin 600 is pushed inward by the sidewall of the cam track 440. Since the cam follower pin 600 is connected to an output device, the output device will also move inward and closer to the epicycloid planet gear 400.

As the recessed slot of the cam track 440 increases in distance from the center of the epicycloid planet gear 400 (moves away from the eccentric mounting hole 430) the cam follower contact surface 620 of the cam follower pin 600 is pushed outward by the sidewall of the cam track 440. Since the cam follower pin 600 is connected to an output device, the output device will also move outward and farther away from the epicycloid planet gear 400.

Figure 10A:
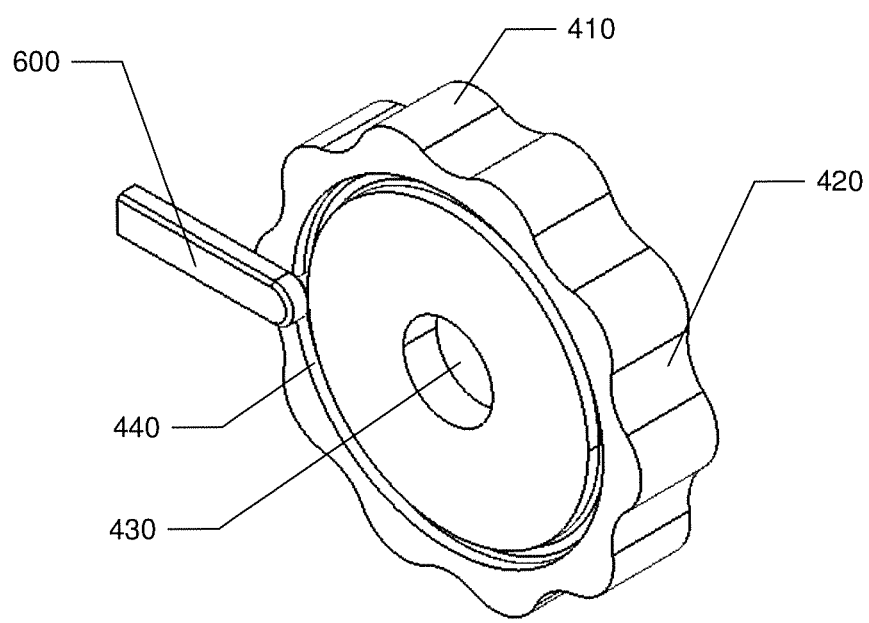
FIG. 10A is an isometric view drawing illustrating an epicycloid planet gear with slotted cam track according to an embodiment of the present invention.
Figure 10B:
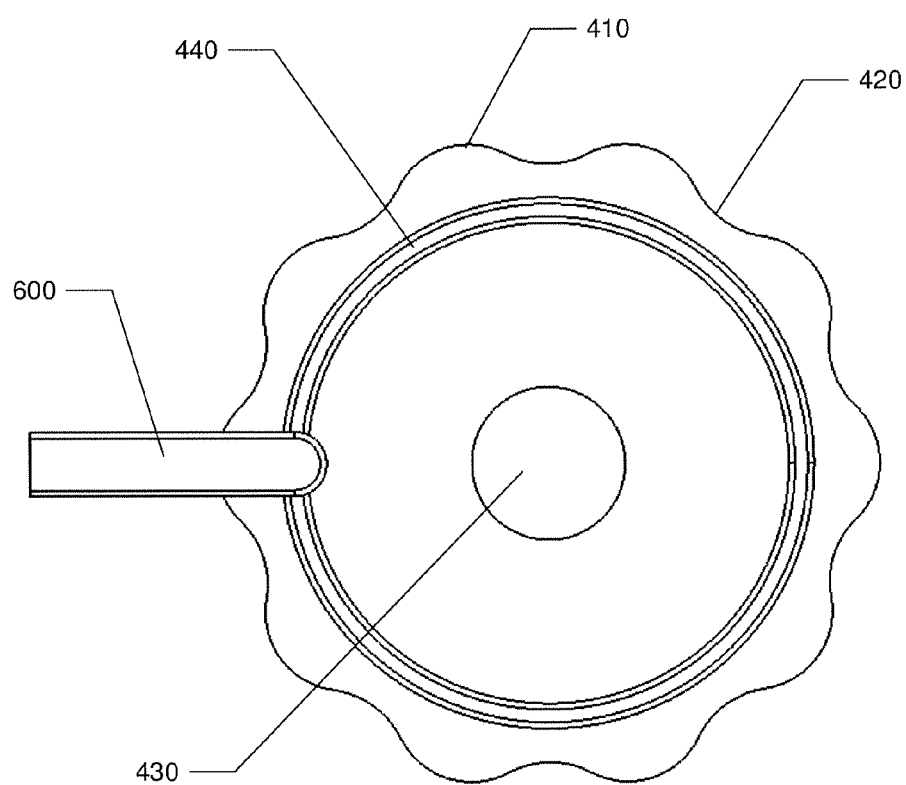
FIG. 10B is a top view drawing illustrating an epicycloid planet gear with slotted cam track according to an embodiment of the present invention.
Figure 10C:
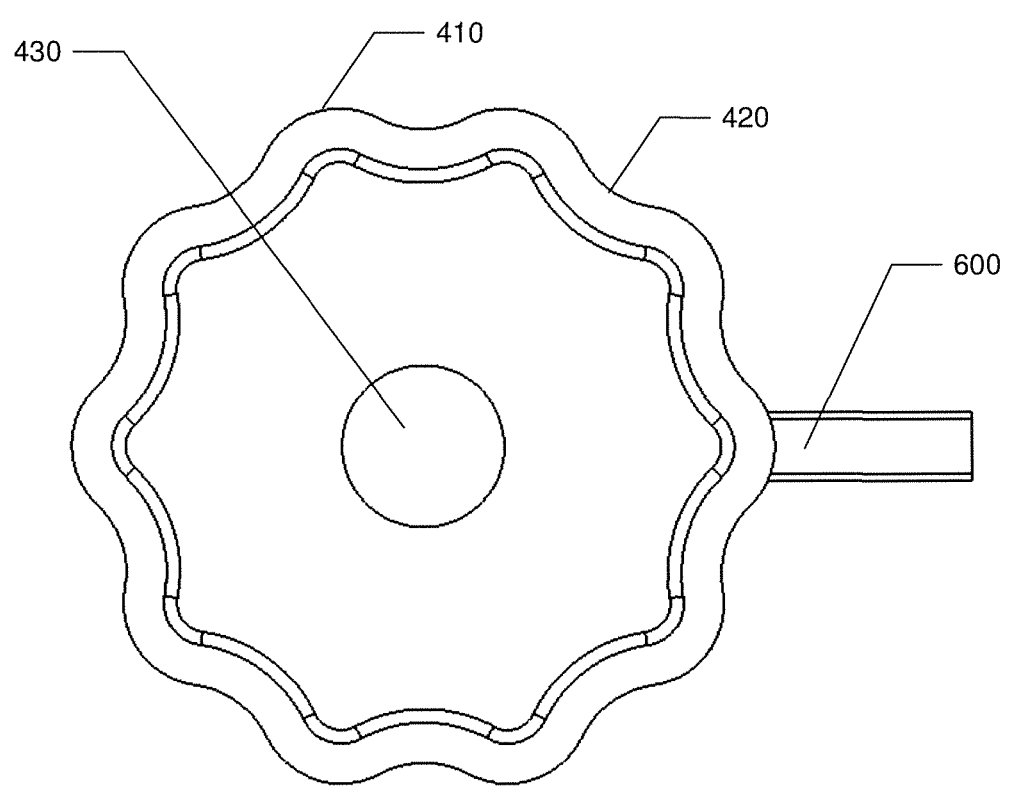
FIG. 10C is a bottom view drawing illustrating an epicycloid planet gear with slotted cam track according to an embodiment of the present invention.
Figure 10D:
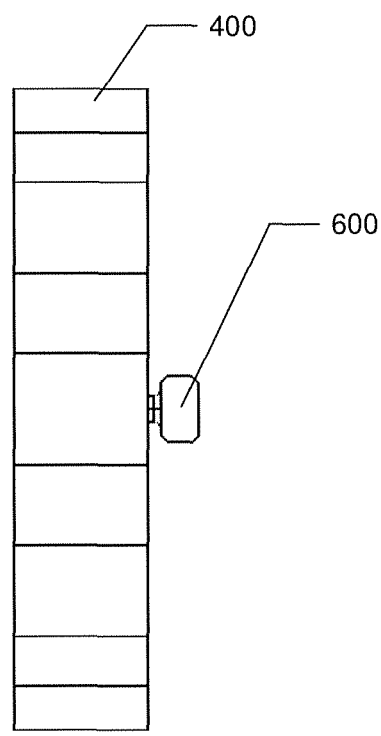
FIG. 10D is a side view drawing illustrating an epicycloid planet gear with slotted cam track according to an embodiment of the present invention.
Figure 10E:
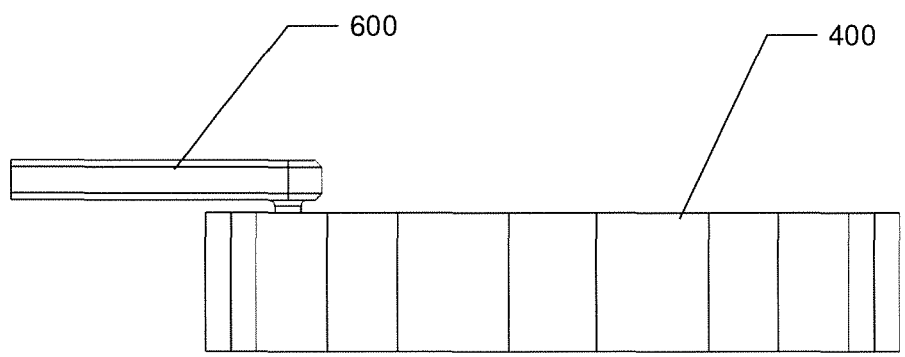
FIG. 10E is a side view drawing illustrating an epicycloid planet gear with slotted cam track according to an embodiment of the present invention.
Figure 10F:
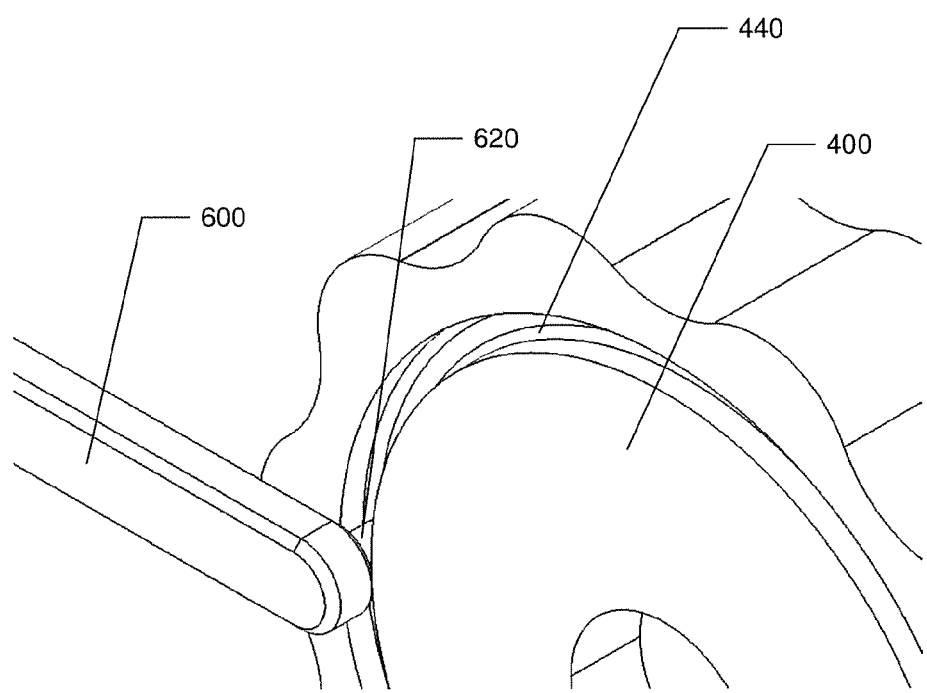
FIG. 10F is an isometric view drawing illustrating a cam follower pin and epicycloid planet gear with slotted cam track according to an embodiment of the present invention.
Figure 10G:
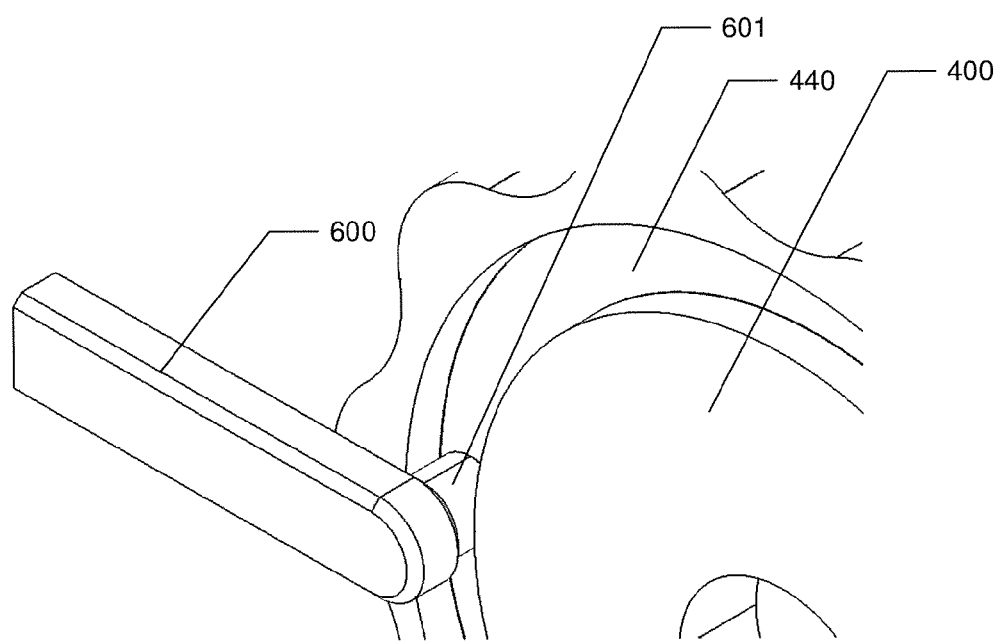
FIG. 10G is an isometric view drawing illustrating a cam follower pin with roller and epicycloid planet gear with slotted cam track according to an embodiment of the present invention.

Refer to FIG. 10G, which is an isometric view drawing illustrating a cam follower pin with roller and epicycloid planet gear with slotted cam track according to an embodiment of the present invention.

In the embodiment of the present invention illustrated in FIG. 10G the cam follower pin 600 further comprises a cam follower roller 601. In this embodiment the cam follower roller 601 contacts and rolls along the sidewalls of the slotted cam track 440 as the epicycloid planet gear 400 rotates. The cam follower roller 601 reduces friction between the cam follower pin 600 and the cam track 440.

Figure 10H:
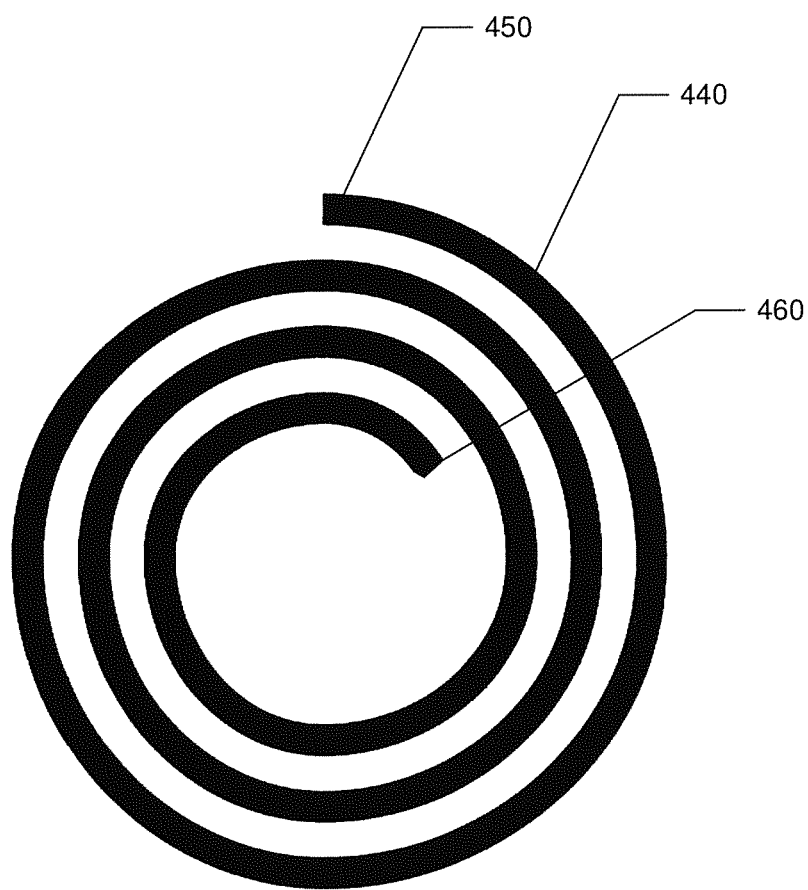
FIG. 10H is a drawing illustrating a slotted cam track of an epicycloid planet gear according to an embodiment of the present invention.
Figure 10I:
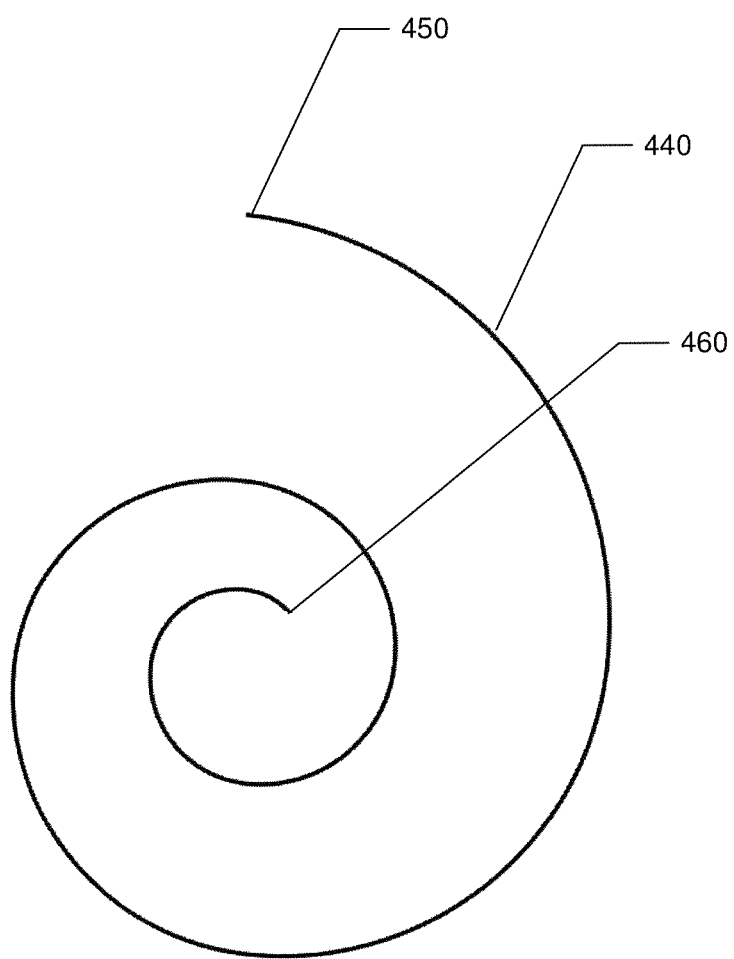
FIG. 10I is a drawing illustrating a slotted cam track of an epicycloid planet gear according to an embodiment of the present invention.
Figure 10J:
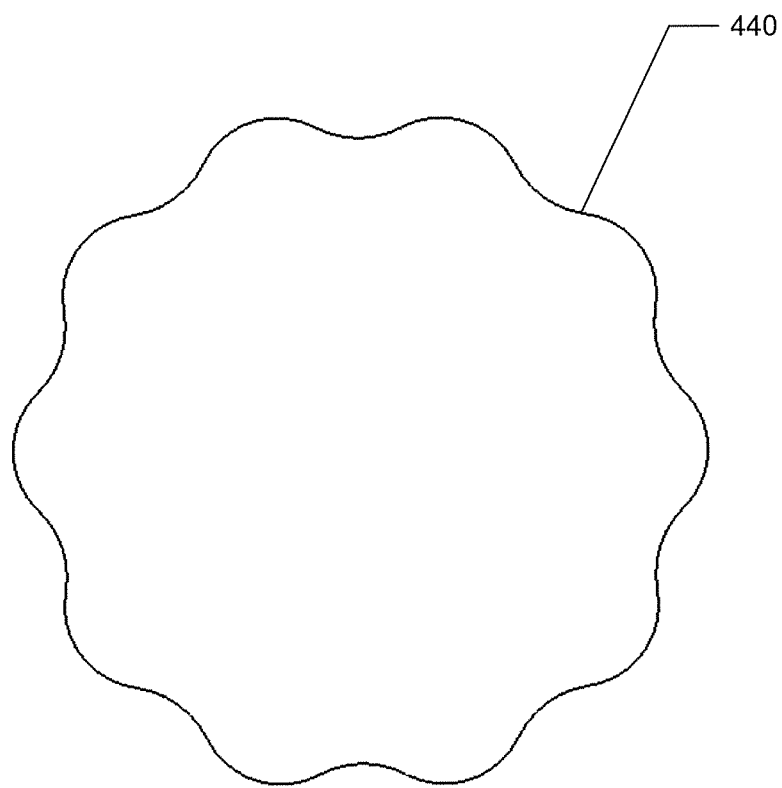
FIG. 10J is a drawing illustrating a slotted cam track of an epicycloid planet gear according to an embodiment of the present invention.

Refer to FIGS. 10H-10J, which are drawings illustrating a slotted cam track of an epicycloid planet gear according to embodiments of the present invention.

In an embodiment of the present invention the cam track 440 gradually decreases in distance from the center and comprises a cam track start 450 and a cam track end 460 as shown in FIG. 10H.

In an embodiment of the present invention as the epicycloid planet gear rotates the cam follower pin moves at a constant or linear rate.

In an embodiment of the present invention the cam track 440 decreases in distance from the center at an increasing rate and comprises a cam track start 450 and a cam track end 460 as shown in FIG. 10I.

In an embodiment of the present invention as the epicycloid planet gear rotates the cam follower pin moves at an exponential rate.

In other embodiments of the present invention the cam track 440 comprises other designs. For example, the cam track 440 gradually increases and decreases in distance from the center around the epicycloid planet gear 400 in an uninterrupted path causing the cam follower pin to gradually and continually move inward and outward. Or for example, the cam track 440 increases and decreases in distance from the center multiple times around the epicycloid planet gear 400 causing the cam follower pin to continually move inward and outward at a faster speed as shown in FIG. 10J.

As a result, the epicycloid planet gear cam of the present invention can be used in or adapted to numerous applications by simply changing the epicycloid planet gear cam with another cam track pattern.

Following is a description of the epicycloid planet gear cam of the present invention assembly process. Refer to all Figures.

First, the DC motor 900 is attached to the stationary housing 200 using fasteners through the assembly holes 250.

Next, the driveshaft eccentric 500 is assembled to the driveshaft 950 that is extending through the driveshaft clearance hole 240 and into the interior of the stationary housing 200. The driveshaft 950 is inserted into the eccentric hole 540 and a fastener is used to assemble the driveshaft 950 to the driveshaft eccentric 500.

Next, the epicycloid planet gear 400 is placed on the driveshaft eccentric 500 by inserting the epicycloid planet gear eccentric driver 510 into the eccentric mounting hole 430 with the cam track 450 facing up (away from the bottom interior surface of the stationary housing 200).

Some of the plurality of cycloid lobes 410 and cycloid lobe clearances 420 should now engage with some of the plurality of ring gear lobes 280 and ring gear lobe clearances 290.

Next, the lens carrier 700, or other output device, is assembled to the cam follower pin 600. The top of the cam follower support bracket 300 is positioned between the top mount 730 and the bottom mount 740 with the arms of the anti-rotation feature 745 spanning and partially surrounding the cam follower support bracket 330.

The cam follower clearance hole 320 and the cam follower press fit hole 750 are aligned and the cam follower pin 600 is press fit into the cam follower press fit hole 750. The lens carrier 700 is now assembled to the cam follower pin 600 in the cam follower support bracket 300.

One end of the cam follower pin 600 now extends slightly above the top mount 730. The cam follower body 610 extends through the cam follower press fit hole 750 of the top mount 730, the cam follower clearance hole 320 in the top of the cam follower support bracket 300, the cam follower press fit hole 750 in the bottom mount 740, the cam follower clearance hole 320 in the bottom of the cam follower support bracket, and extends into the interior of the housing cap 300. The cam follower contact surface 620 is now positioned in the interior of the housing cap 300.

Next, the lens body 710 is aligned with the housing clearance 270 and the plurality of assembly snaps 310 is aligned with the plurality of snap clearance holes 230. The housing cap 300 assembly and the stationary housing 200 assembly are pressed together until the plurality of snap details 315 grasp the plurality of housing retainers 210.

Next, the return leaf spring 800 is assembled to the housing cap 300. The spring base 810 is positioned in the leaf spring tracks 350 and the spring mounting hole 840 is aligned with the leaf spring retainer holes 340 with the a spring tip 830 covering the top of the cam follower pin 600 extending above the top mount 730. Fasteners are used through the spring mounting hole 840 and into the leaf spring retainer holes 340 to attach the return leaf spring 800 to the housing cap 300.

It should be noted that the above is a general assembly guide. Steps in the process can be rearranged as needed.

Following is a description of the operation of the epicycloid planet gear cam of the present invention. Refer to all Figures.

When power is applied to the contacts 920 the driveshaft 950 will rotate as will the connected driveshaft eccentric 500. The epicycloid planet gear eccentric driver 510 in the eccentric mounting hole 430 drives the epicycloid planet gear 400 in an eccentric, cycloidal motion. As the epicycloid planet gear eccentric driver 510 rotates in one direction the eccentric mounting hole 430 (and the epicycloid planet gear 400) rotates in the opposite direction.

As the epicycloid planet gear 400 rotates, the cam follower contact surface 620 rides the cam track 440 or encounters the cam track start 450. At the cam track start 450 the cam track 440 is at the lowest height, the cam follower pin 600 is at its lowest point, and the lens carrier 700 is at is most retracted position. As the epicycloid planet gear 400 continues to rotate the cam follower contact surface 620 rides along the cam track 440. As the cam track 440 rises in height the cam follower pin 600 raises and the lens carrier 700 moves out (forward). As the cam track 440 decreases in height the cam follower pin 600 lowers and the lens carrier 700 moves in (backward).

By controlling the amount of rotation and the rotational direction of the driveshaft 950, the positioning of the lens carrier 700 can be accurately controlled by positioning the cam follower contact surface 620 on the appropriate position on the cam track 440.

It will be apparent to those skilled in the art that various modifications and variations can be made to the present invention without departing from the scope or spirit of the invention. In view of the foregoing, it is intended that the present invention cover modifications and variations of this invention provided they fall within the scope of the invention and its equivalent.

What is claimed is:

1. An epicycloid planet gear cam comprising:
   a stationary housing comprising:
      an internal stationary ring gear comprising a plurality of ring gear lobes and a plurality of ring gear lobe clearances disposed between the plurality of ring gear lobes; and
      a driveshaft clearance hole;
   a cam follower pin;
   an epicycloid planet gear disposed in the internal stationary ring gear comprising:
      a cycloid body;
      a plurality of cycloid lobes disposed around the cycloid body;
      a plurality of cycloid lobe clearances disposed between the plurality of cycloid lobes;
         wherein, the plurality of cycloid lobes and the plurality of cycloid lobe clearance engage with the plurality of ring gear lobes and the plurality of ring gear lobe clearances;
      an eccentric mounting hole disposed in the cycloid body; and
      a cam track disposed on the cycloid body, the cam follower pin contacting the cam track;
         wherein, as the epicycloid planet gear rotates, the cam track causes the cam follower pin to move in relation to variances of the cam track;
   a driveshaft eccentric comprising:
      a cycloid mounting disc;

an epicycloid planet gear eccentric driver disposed on the cycloid mounting disc, the epicycloid planet gear eccentric driver rotating freely in the eccentric mounting hole;

an eccentric driver counterbalance disposed on an opposite side of the cycloid mounting disc from the epicycloid planet gear eccentric driver and positioned at a half-rotation relative to the epicycloid planet gear eccentric driver; and an eccentric hole extending through the cycloid mounting disc, the epicycloid planet gear eccentric driver, and the eccentric driver counterbalance;

wherein, the driveshaft eccentric connects with a driveshaft extending through the driveshaft clearance hole and into the eccentric hole; and wherein the epicycloid planet gear cam simultaneously converts rotational movement of the driveshaft into linear movement, reduces speed, and increases torque.

2. The epicycloid planet gear cam of claim 1, wherein the cam track varies in height away from the cycloid body and as the epicycloid planet gear rotates, the cam track causes the cam follower pin to move in relation to the height of the cam track.

3. The epicycloid planet gear cam of claim 1, the cam track comprising:
a cam track start; and
a cam track end, the cam track gradually increasing in height above the cycloid body starting from the cam track start to the cam track end.

4. The epicycloid planet gear cam of claim 1, wherein the cam track gradually increases and decreases in height around the epicycloid planet gear in an uninterrupted path causing the cam follower pin to continuously raise and lower.

5. The epicycloid planet gear cam of claim 1, wherein the cam track increases and decreases in height multiple times around the epicycloid planet gear causing the cam follower pin to continually raise and lower at a faster speed.

6. The epicycloid planet gear cam of claim 1, the cam track comprising a slot disposed in the cycloid body, the cam track varying in distance away from a center of the epicycloid planet gear.

7. The epicycloid planet gear cam of claim 1, the cam track comprising a slot disposed in the cycloid body, the cam track gradually decreasing in distance from a center of the epicycloids planet gear at a constant rate.

8. The epicycloid planet gear cam of claim 1, the cam track comprising a slot disposed in the cycloid body, the cam track decreasing in distance from a center of the epicycloids planet gear at an exponential rate.

9. The epicycloid planet gear cam of claim 1, the cam track comprising a slot disposed in the cycloid body, the cam track gradually increasing and decreasing in distance from a center of the epicycloid planet gear in an uninterrupted path around the cycloid body.

10. The epicycloid planet gear cam of claim 1, the cam track comprising a slot disposed in the cycloid body, the cam track increasing and decreasing in distance from a center of the epicycloid planet gear multiple times around the cycloid body.

11. An epicycloid planet gear cam comprising:
a stationary housing comprising:
an internal stationary ring gear comprising a plurality of ring gear lobes and a plurality of ring gear lobe clearances disposed between the plurality of ring gear lobes; and
a driveshaft clearance hole;
a cam follower pin;
an epicycloid planet gear disposed in the internal stationary ring gear comprising:
a cycloid body;
a plurality of cycloid lobes disposed around the cycloid body;
a plurality of cycloid lobe clearances disposed between the plurality of cycloid lobes;
wherein, the plurality of cycloid lobes and the plurality of cycloid lobe clearance engage with the plurality of ring gear lobes and the plurality of ring gear lobe clearances;
an eccentric mounting hole disposed in the cycloid body; and
a cam track disposed on the cycloid body, the cam follower pin contacting the cam track, and the cam track varying in height away from the cycloid body;
wherein, as the epicycloid planet gear rotates, the cam track causes the cam follower pin to move in relation to the height of the cam track;
a driveshaft eccentric comprising:
a cycloid mounting disc;
an epicycloid planet gear eccentric driver disposed on the cycloid mounting disc, the epicycloid planet gear eccentric driver rotating freely in the eccentric mounting hole;
an eccentric driver counterbalance disposed on an opposite side of the cycloid mounting disc from the epicycloid planet gear eccentric driver and positioned at a half-rotation relative to the epicycloid planet gear eccentric driver; and
an eccentric hole extending through the cycloid mounting disc, the epicycloid planet gear eccentric driver, and the eccentric driver counterbalance;
wherein, the driveshaft eccentric connects with a driveshaft extending through the driveshaft clearance hole and into the eccentric hole; and
wherein the epicycloid planet gear cam simultaneously converts rotational movement of the driveshaft into linear movement, reduces speed, and increases torque.

12. The epicycloid planet gear cam of claim 11, the cam track comprising:
a cam track start; and
a cam track end, the cam track gradually increasing in height above the cycloid body starting from the cam track start to the cam track end.

13. The epicycloid planet gear cam of claim 11, wherein the cam track gradually increases and decreases in height around the epicycloid planet gear in an uninterrupted path causing the cam follower pin to continuously raise and lower.

14. The epicycloid planet gear cam of claim 11, wherein the cam track increases and decreases in height multiple times around the epicycloid planet gear causing the cam follower pin to continually raise and lower at a faster speed.

15. An epicycloid planet gear cam comprising:
a stationary housing comprising:
an internal stationary ring gear comprising a plurality of ring gear lobes and a plurality of ring gear lobe clearances disposed between the plurality of ring gear lobes; and
a driveshaft clearance hole;
a cam follower pin;
an epicycloid planet gear disposed in the internal stationary ring gear comprising:
a cycloid body;

a plurality of cycloid lobes disposed around the cycloid body;

a plurality of cycloid lobe clearances disposed between the plurality of cycloid lobes;

wherein, the plurality of cycloid lobes and the plurality of cycloid lobe clearance engage with the plurality of ring gear lobes and the plurality of ring gear lobe clearances;

an eccentric mounting hole disposed in the cycloid body; and a cam track comprising a slot disposed in the cycloid body, the cam follower pin contacting the cam track, and the cam track varying in distance away from a center of the epicycloid planet gear;

wherein, as the epicycloid planet gear rotates, the cam track causes the cam follower pin to move in relation to the distance of the cam track away from the center of the epicycloid planet gear;

a driveshaft eccentric comprising:

a cycloid mounting disc;

an epicycloid planet gear eccentric driver disposed on the cycloid mounting disc, the epicycloid planet gear eccentric driver rotating freely in the eccentric mounting hole;

an eccentric driver counterbalance disposed on an opposite side of the cycloid mounting disc from the epicycloid planet gear eccentric driver and positioned at a half-rotation relative to the epicycloid planet gear eccentric driver; and an eccentric hole extending through the cycloid mounting disc, the epicycloid planet gear eccentric driver, and the eccentric driver counterbalance;

wherein, the driveshaft eccentric connects with a driveshaft extending through the driveshaft clearance hole and into the eccentric hole; and wherein the epicycloid planet gear cam simultaneously converts rotational movement of the driveshaft into linear movement, reduces speed, and increases torque.

16. The epicycloid planet gear cam of claim 15, wherein the cam track gradually decreases in distance from the center of the epicycloid planet gear at a constant rate.

17. The epicycloid planet gear cam of claim 15, wherein the cam track decreases in distance from the center of the epicycloid planet gear at an exponential rate.

18. The epicycloid planet gear cam of claim 15, wherein the cam track gradually increases and decreases in distance from the center of the epicycloid planet gear in an uninterrupted path around the cycloid body.

19. The epicycloid planet gear cam of claim 15, wherein the cam track increases and decreases in distance from the center of the epicycloid planet gear multiple times around the cycloid body.

* * * * *